United States Patent
Hwang et al.

(10) Patent No.: US 11,968,603 B2
(45) Date of Patent: Apr. 23, 2024

(54) DEVICE AND METHOD FOR V2X COMMUNICATION

(71) Applicant: LG ELECTRONICS INC., Seoul (KR)

(72) Inventors: Jaeho Hwang, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 326 days.

(21) Appl. No.: 17/422,062

(22) PCT Filed: Jan. 10, 2019

(86) PCT No.: PCT/KR2019/000421
§ 371 (c)(1),
(2) Date: Jul. 9, 2021

(87) PCT Pub. No.: WO2020/145438
PCT Pub. Date: Jul. 16, 2020

(65) Prior Publication Data
US 2022/0103986 A1  Mar. 31, 2022

(51) Int. Cl.
*H04W 4/40* (2018.01)
*G08G 1/01* (2006.01)

(52) U.S. Cl.
CPC ............ *H04W 4/40* (2018.02); *G08G 1/0112* (2013.01)

(58) Field of Classification Search
None
See application file for complete search history.

(56) References Cited

U.S. PATENT DOCUMENTS

| | | | |
|---|---|---|---|
| 2018/0137760 A1* | 5/2018 | Kobayashi | G08G 1/16 |
| 2018/0154899 A1 | 6/2018 | Tiwari et al. | |
| 2018/0225970 A1* | 8/2018 | Mitra | G08G 1/096791 |
| 2018/0365909 A1 | 12/2018 | Cheng et al. | |

FOREIGN PATENT DOCUMENTS

WO   2017176550   10/2017

OTHER PUBLICATIONS

PCT International Application No. PCT/KR2019/000421 International Search Report dated Oct. 10, 2019, 4 pages.
Intel Corporation, "Scenarios, Traffic Models and Performance Metrics for eV2X Evaluations," 3GPP TSG RAN WG1 Meeting #93, R1-1806538, May 2018, 16 pages.
LG Electronics, "Discussion on evaluation scenarios for new V2X use cases," 3GPP TSG RAN WG1 Meeting #93, R1-1806639, May 2018, 9 pages.

* cited by examiner

*Primary Examiner* — John F Mortell
(74) *Attorney, Agent, or Firm* — LEE, HONG, DEGERMAN, KANG & WAIMEY

(57) ABSTRACT

Disclosed is a method for transmitting a CPM message by a V2X communication device of a vehicle. Specifically, a method for transmitting a V2X message of a vehicle may comprise the steps of: detecting at least one object by using at least one sensor mounted in the vehicle; sampling a sensor coverage region of the vehicle; generating a point indicating a sensor reaching distance of the at least one sensor mounted in the vehicle for each sampled sensor coverage region; generating a CP message including information relating to the point and the detected at least one object; and transmitting the CP message.

10 Claims, 17 Drawing Sheets

[FIG. 1]
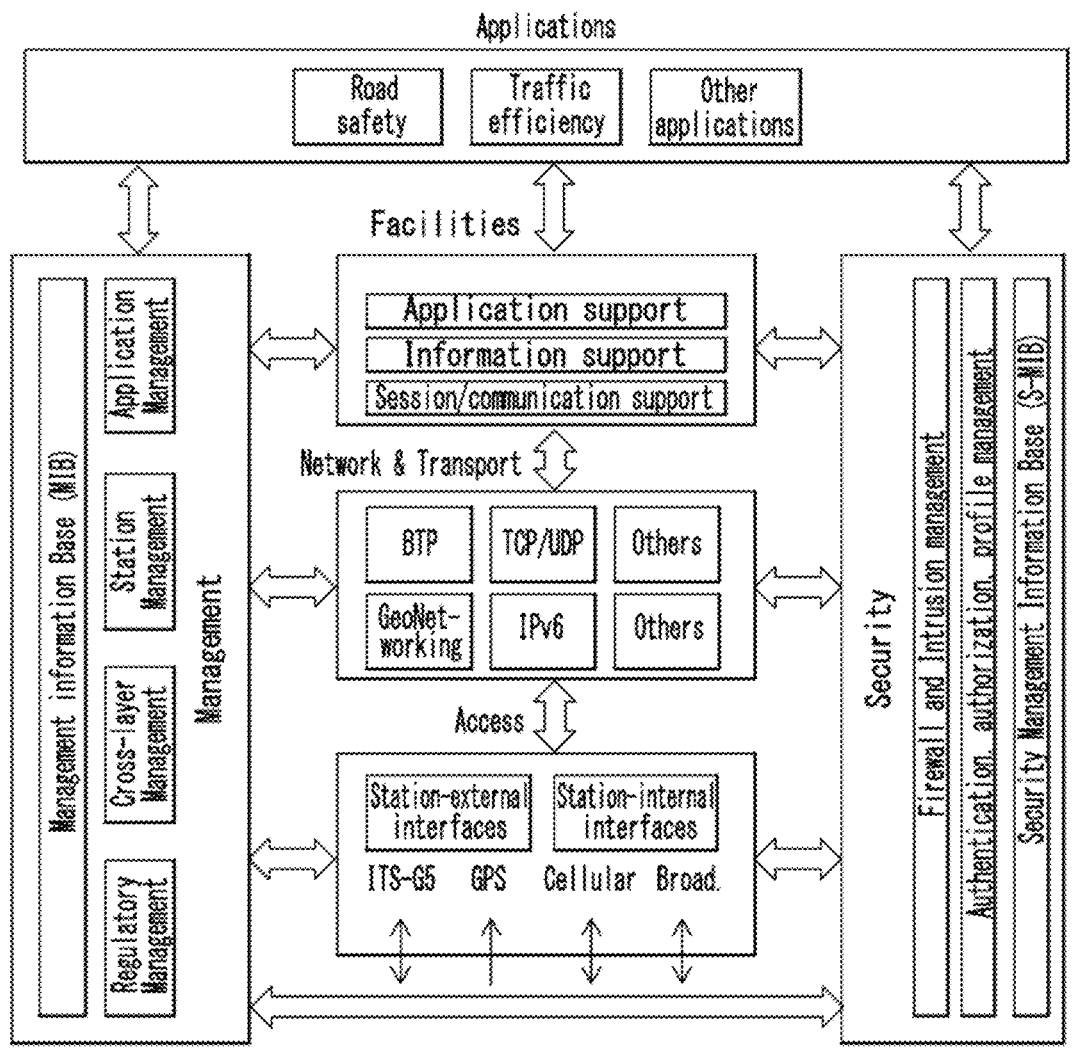

[FIG. 2]
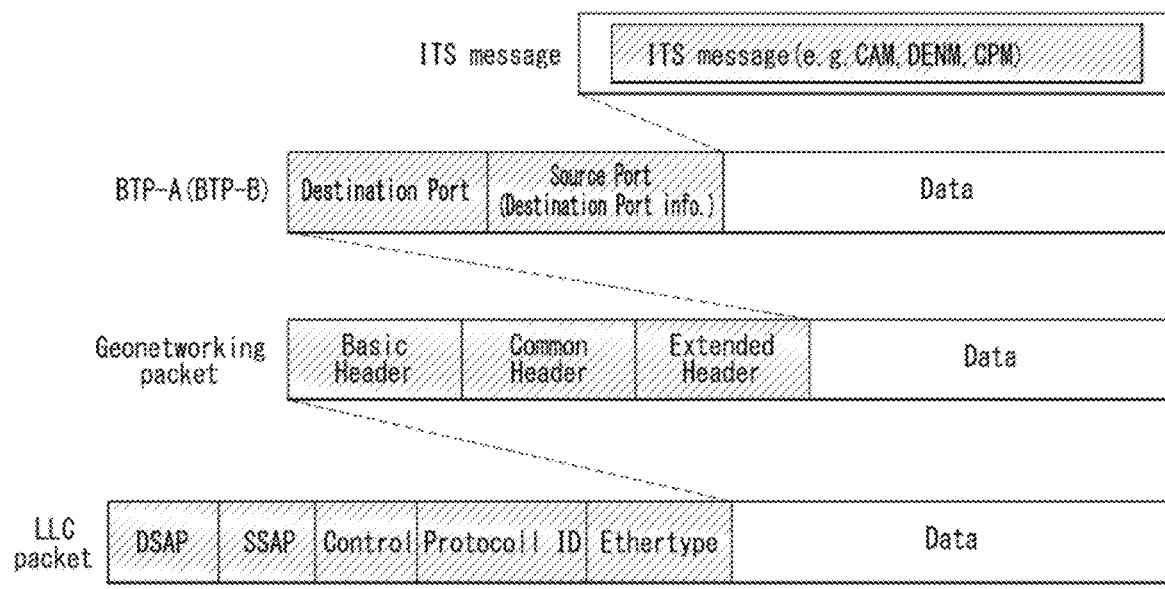
[FIG. 3]
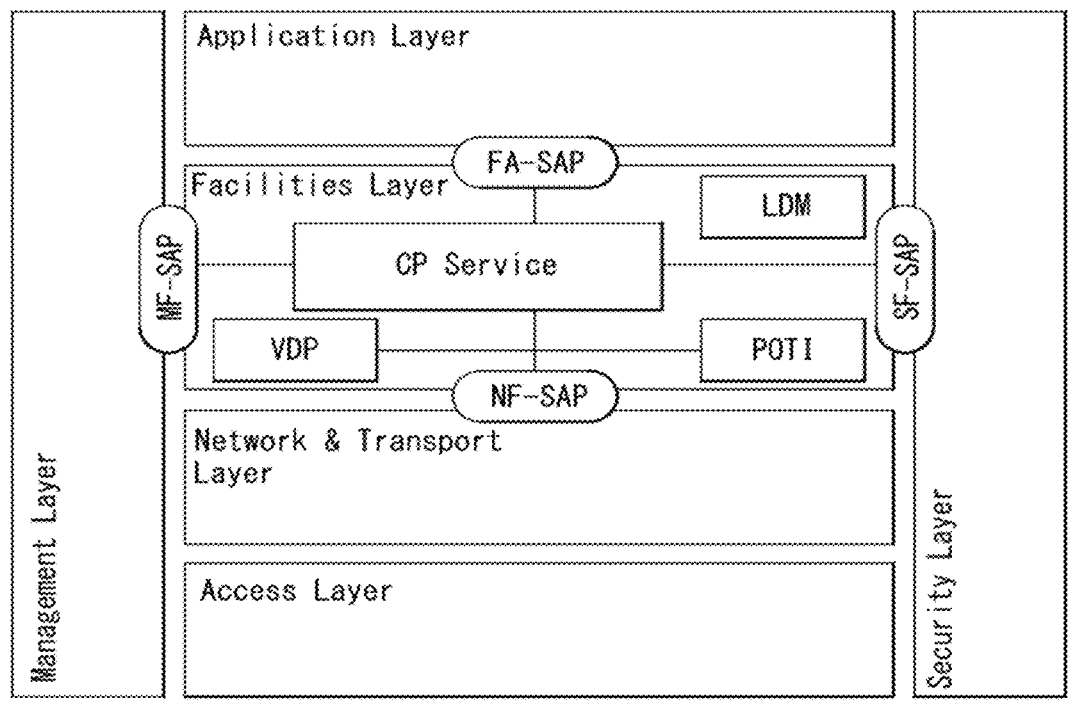

[FIG. 4]
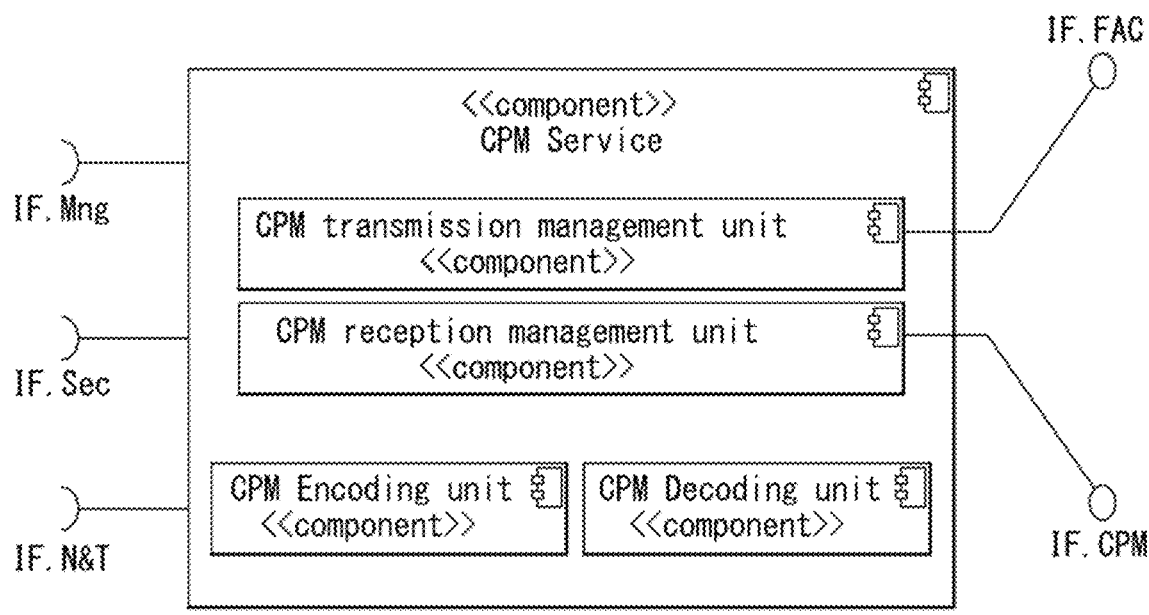
[FIG. 5]
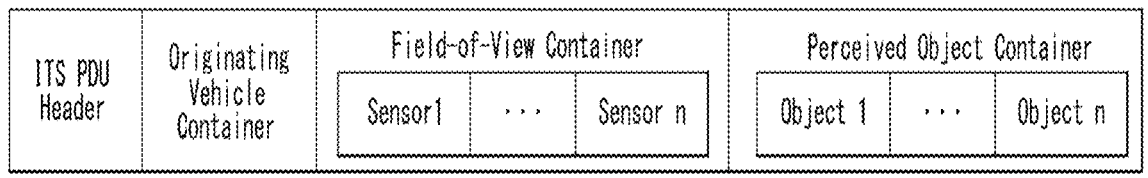

[FIG. 6]
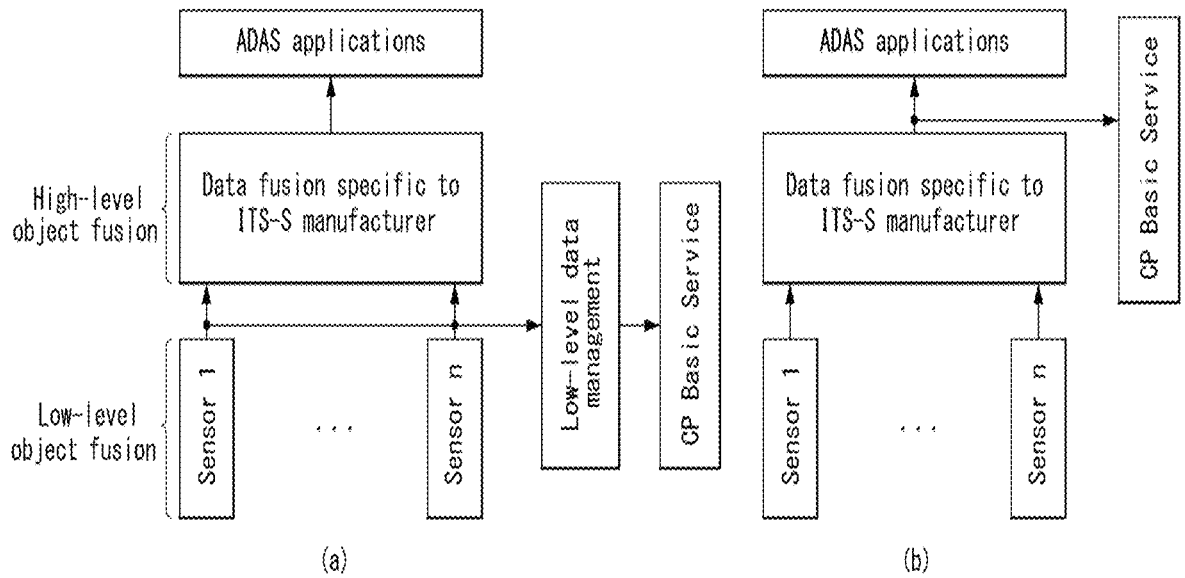
[FIG. 7]
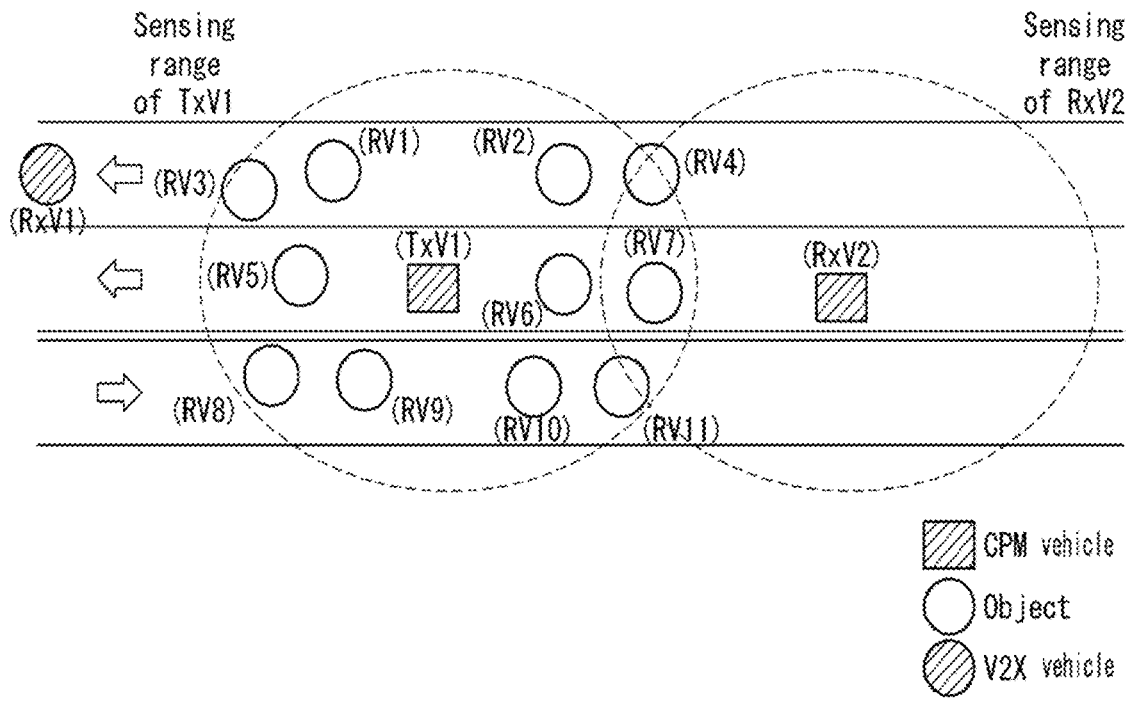

[FIG. 8]
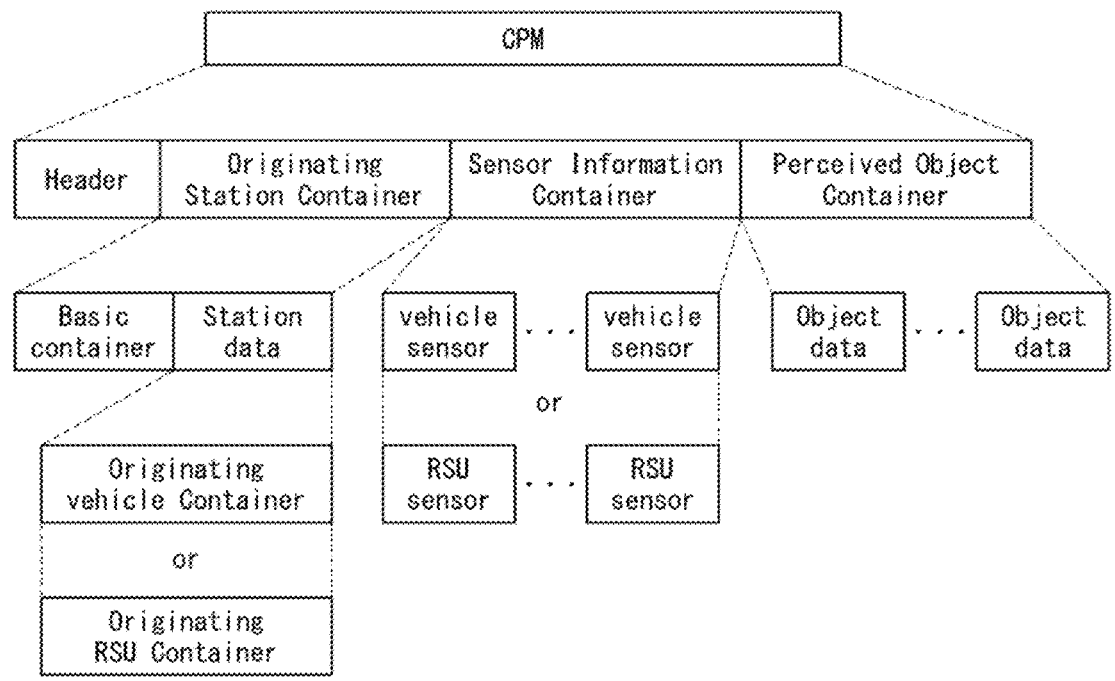
[FIG. 9]
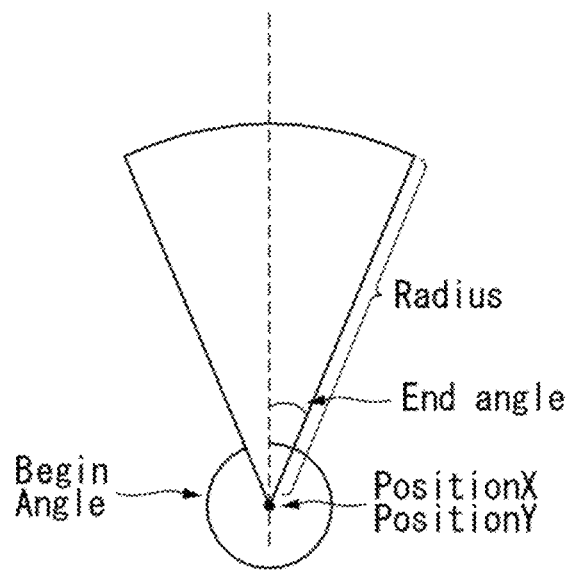

[FIG. 10]
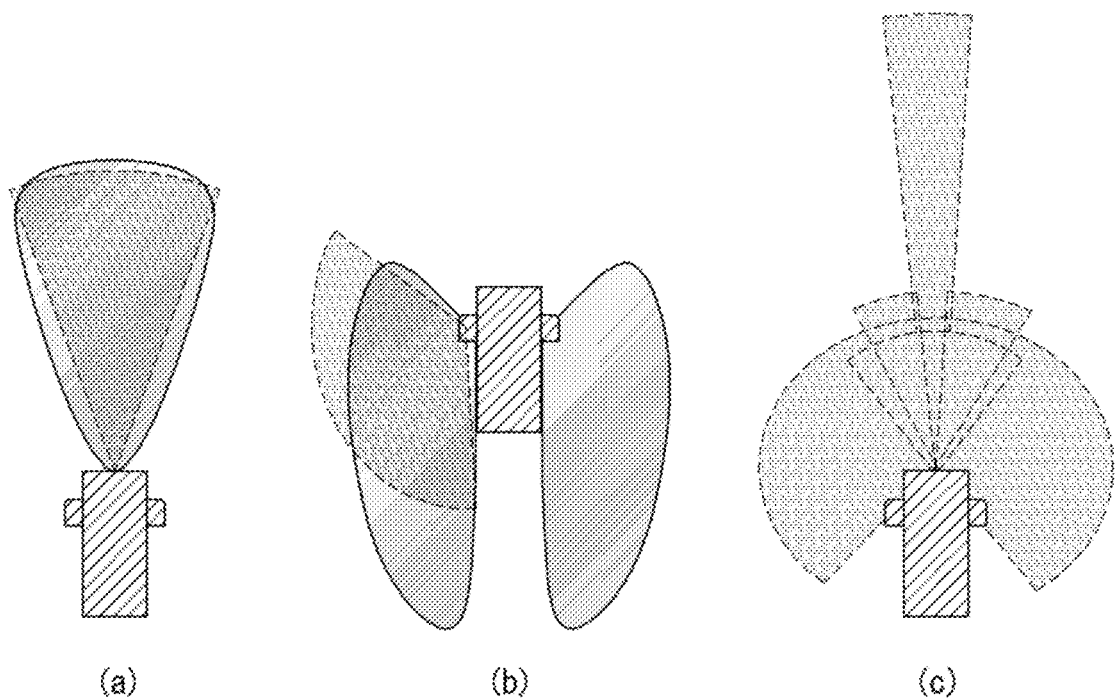
(a) (b) (c)

[FIG. 11]
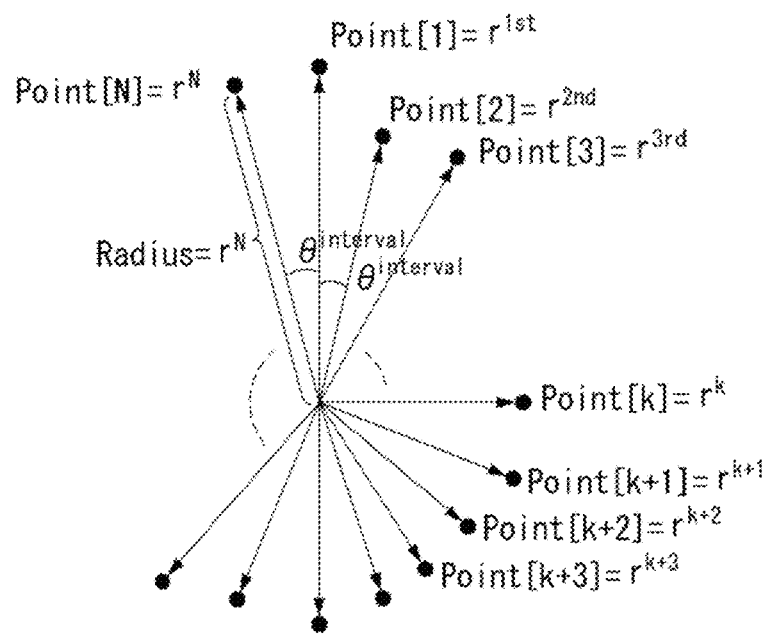
[FIG. 12]
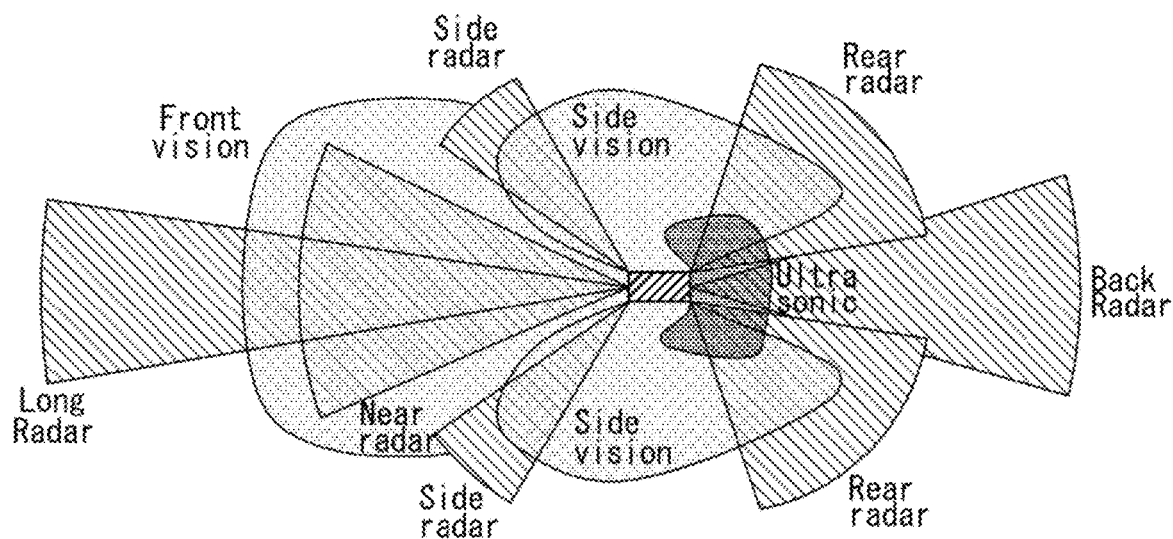

[FIG. 13]
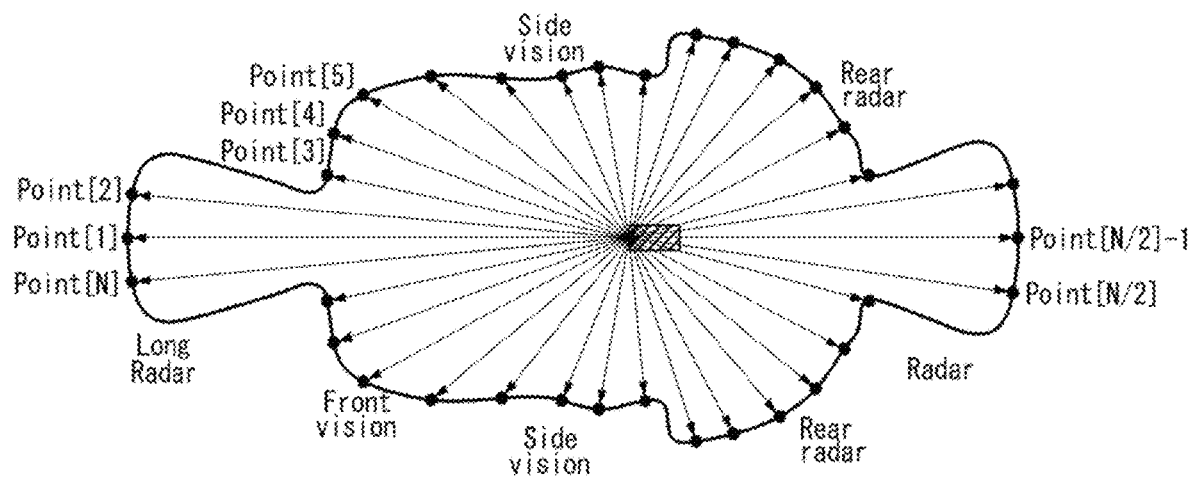
[FIG. 14]
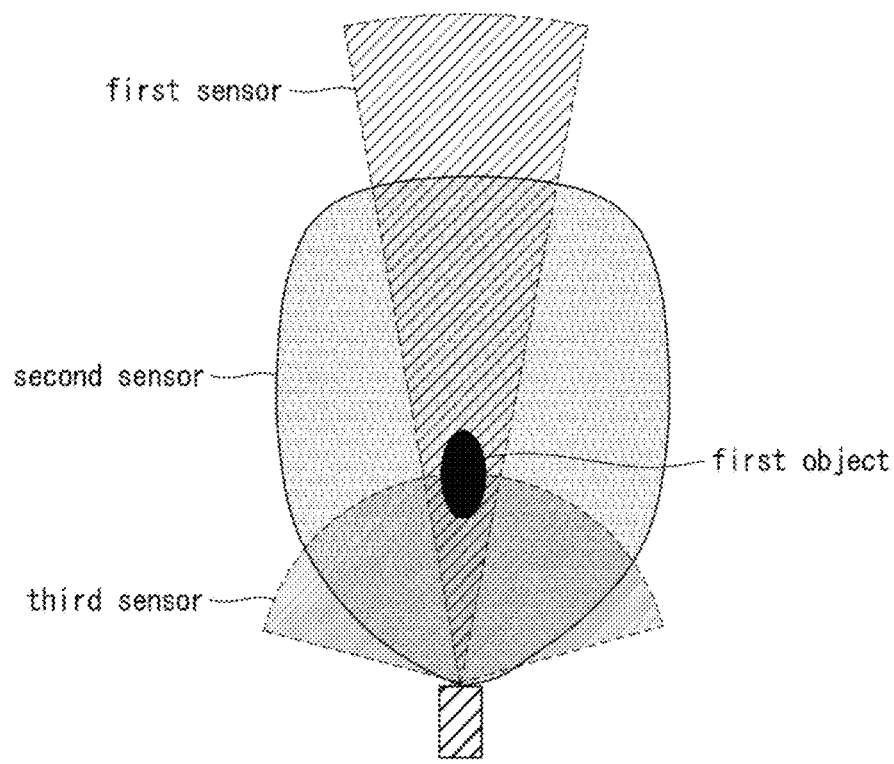

[FIG. 15]
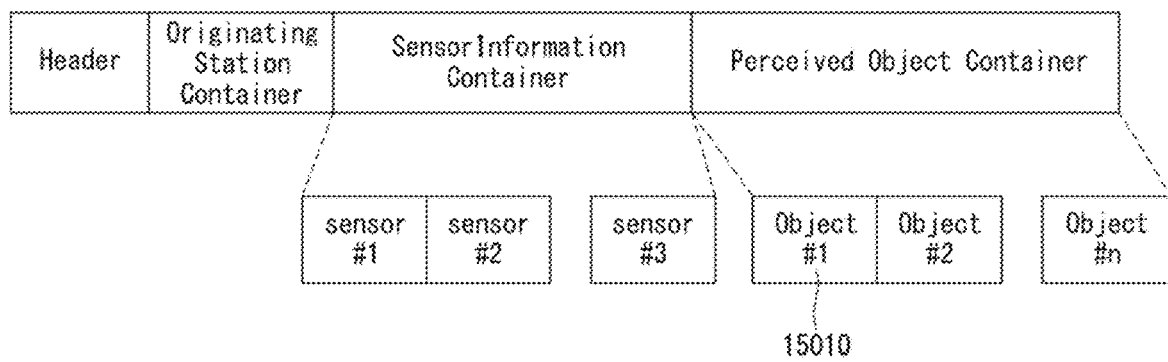
[FIG. 16]
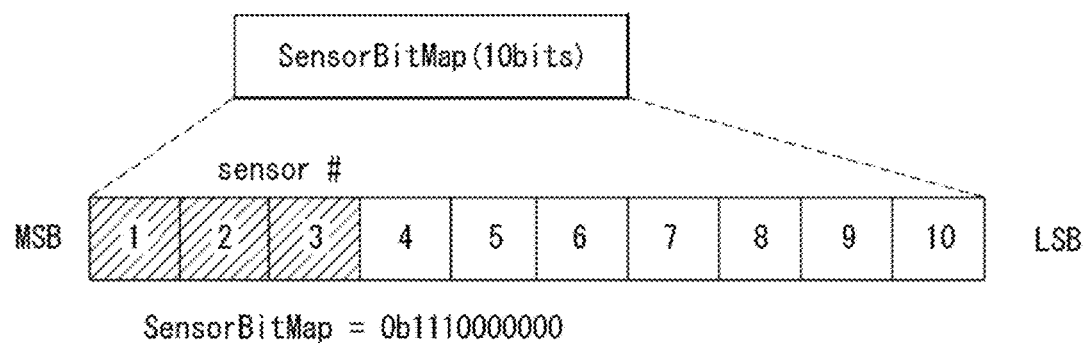

[FIG. 17]
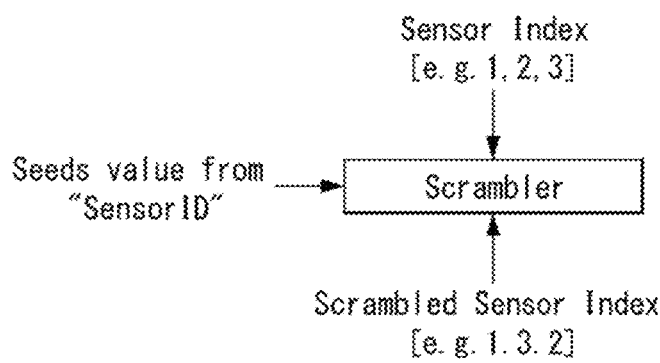
[FIG. 18]
| Header | Originating Station Container | sensor #1 | sensor #2 | sensor #3 | Object #1 | Object #2 | Object # n |
(a)
| Header | Originating Station Container | sensor #1 | sensor #3 | sensor #2 | Object #1 | Object #2 | Object # n |
(b)
| Header | Originating Station Container | sensor #2 | sensor #1 | sensor #3 | Object #1 | Object #2 | Object # n |
(c)

[FIG. 19]
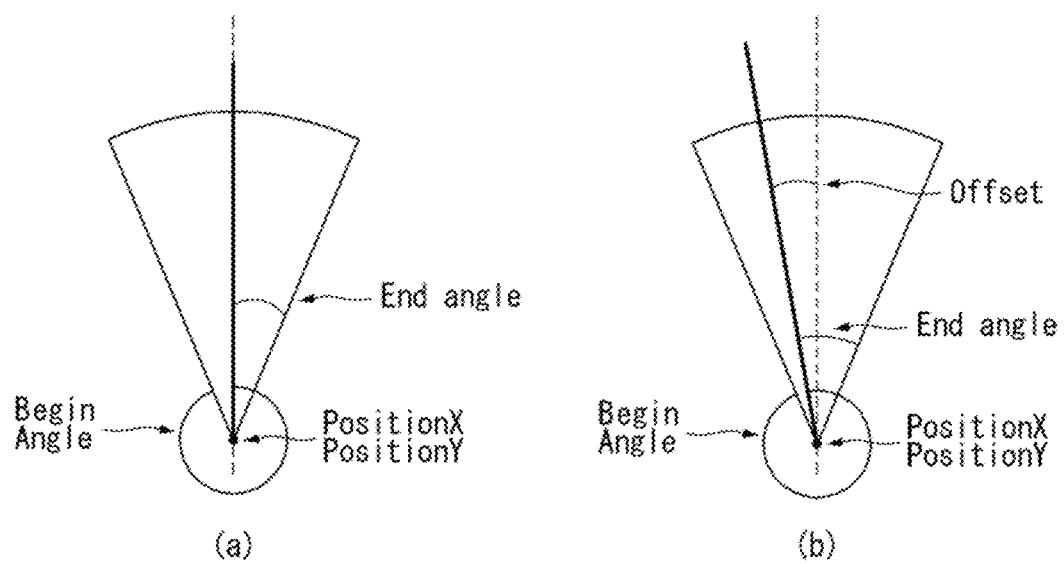

[FIG. 20]
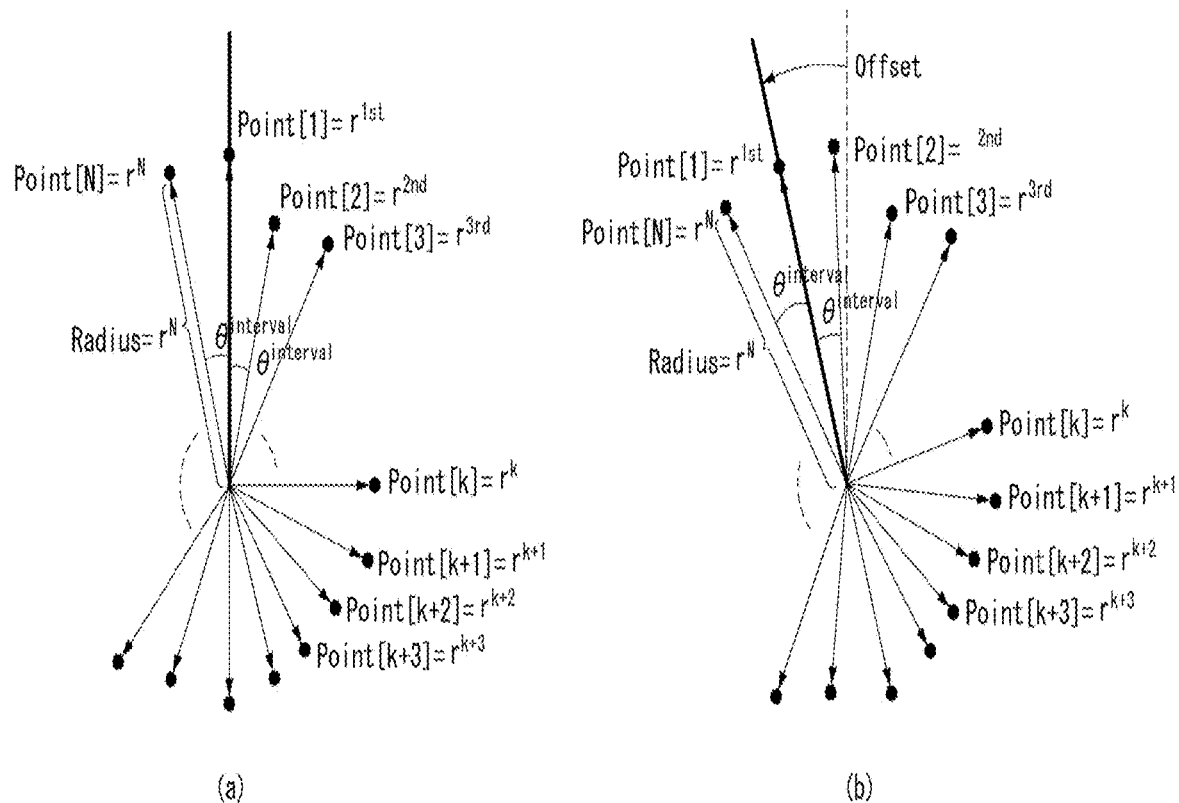
(a)  (b)
[FIG. 21]
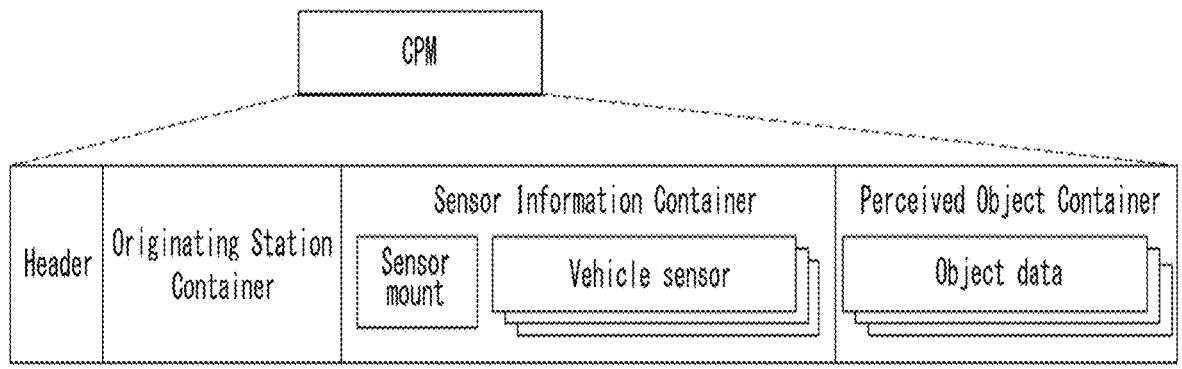

[FIG. 22]

| ASN.1 Representation | |
|---|---|
| DF_SensorInformationContainer | ::=SEQUENCE { |
| Offset | INTEGER |
| numPoint | INTEGER |
| Point | SEQUENCE (SIZE(1..100)) OF INTEGER |
| SensorData | SEQUENCE (SIZE(1..10)) OF DF_SensorData |
| } | |

[FIG. 23]

| ASN.1 Representation | |
|---|---|
| DF_SensorData | ::= SEQUENCE { |
| sensorID | INTEGER |
| sensorType | INTEGER |
| QualityClass | INTEGER |
| } | |

[FIG. 24]

| ASN.1 Representation | |
|---|---|
| DF_ObjectData | ::= SEQUENCE { |
| objectID | INTEGER |
| SensorBitMap | INTEGER |
| timeOfMeasurement | INTEGER |
| xDistance | SEQUENCE |
| yDistance | SEQUENCE |
| ... | ... |
| } | |

[FIG. 25]
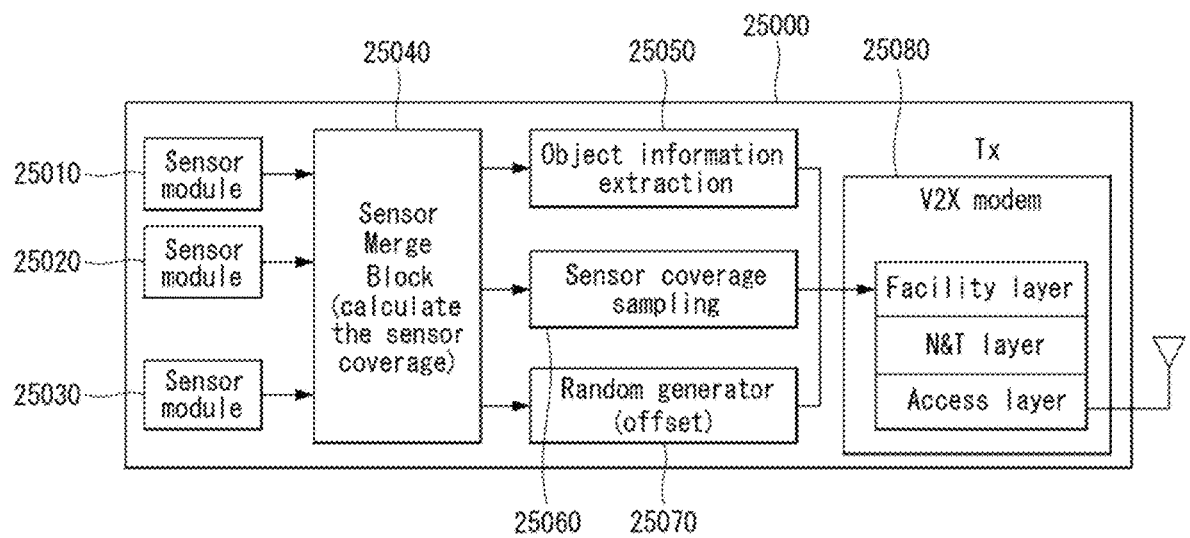
[FIG. 26]
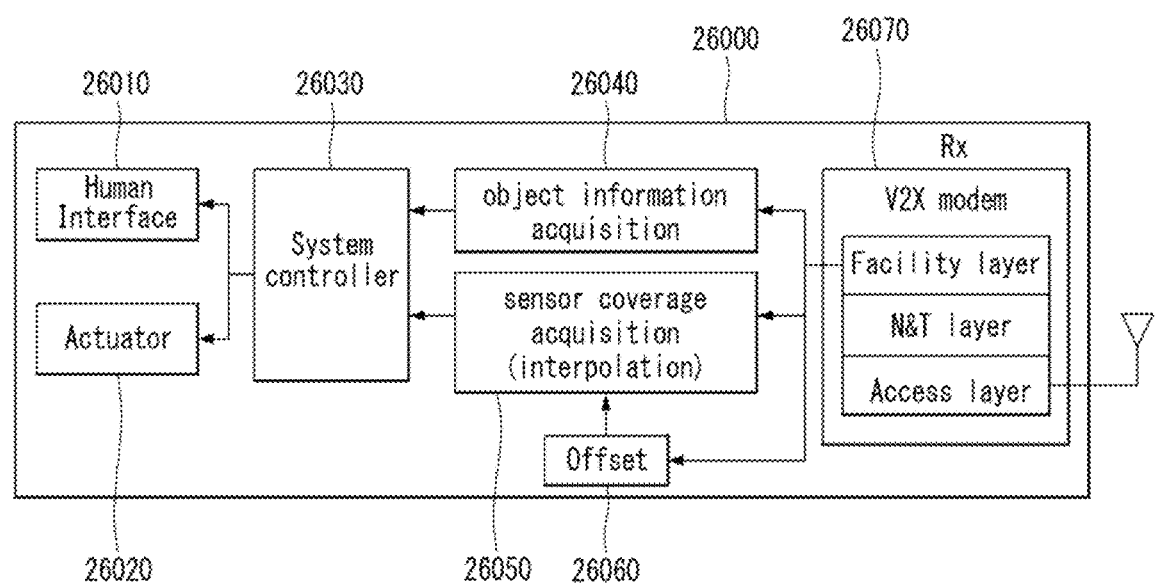

[FIG. 27]
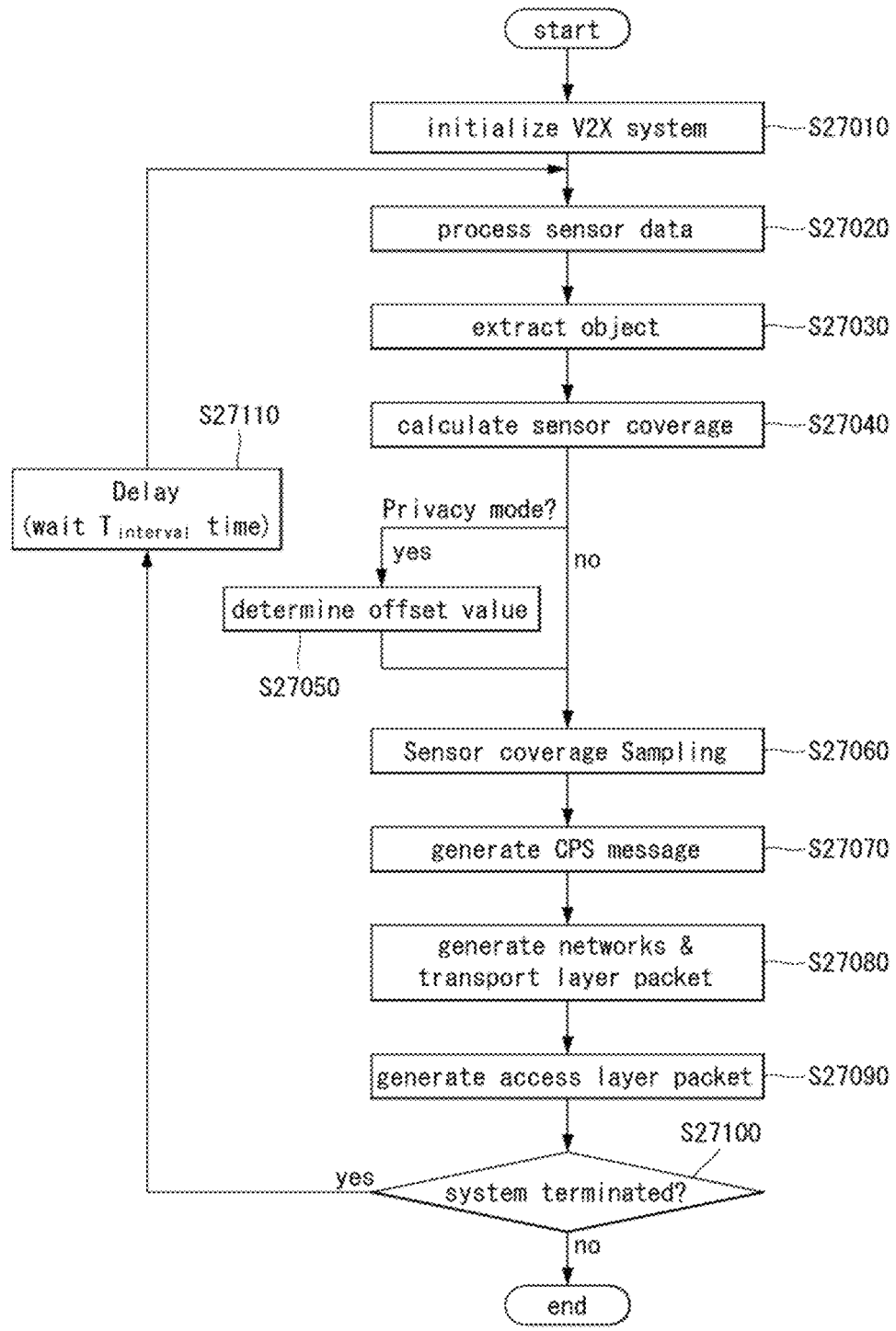

[FIG. 28]
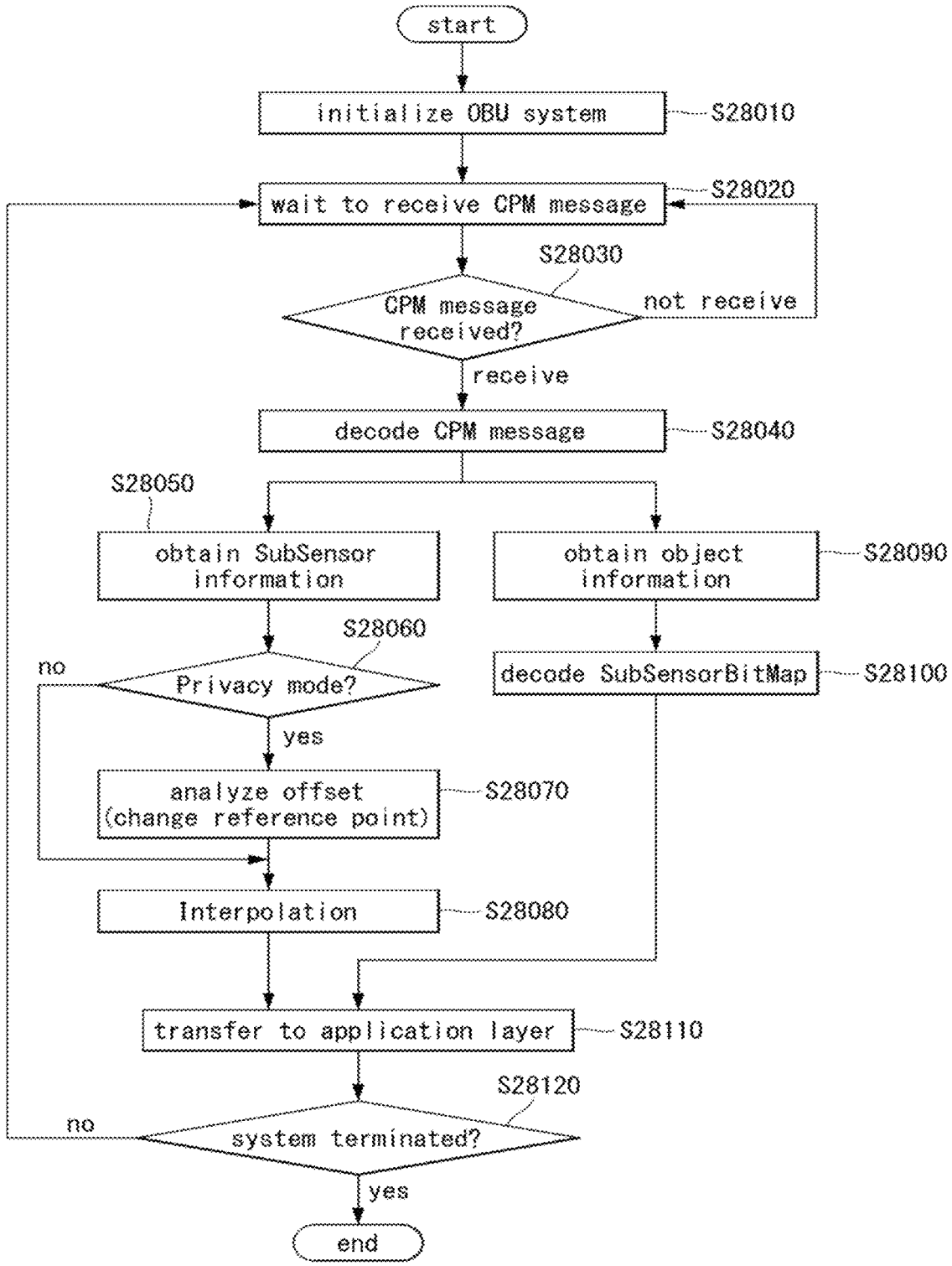

[FIG. 29]
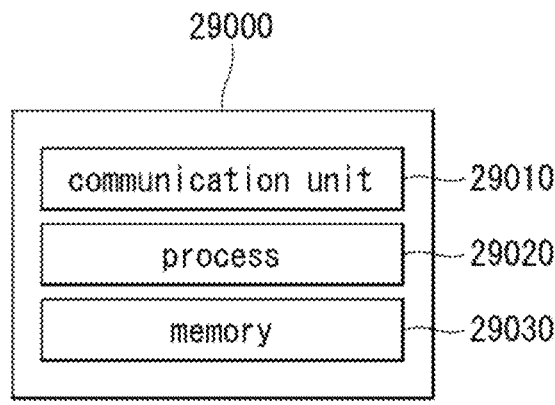
[FIG. 30]
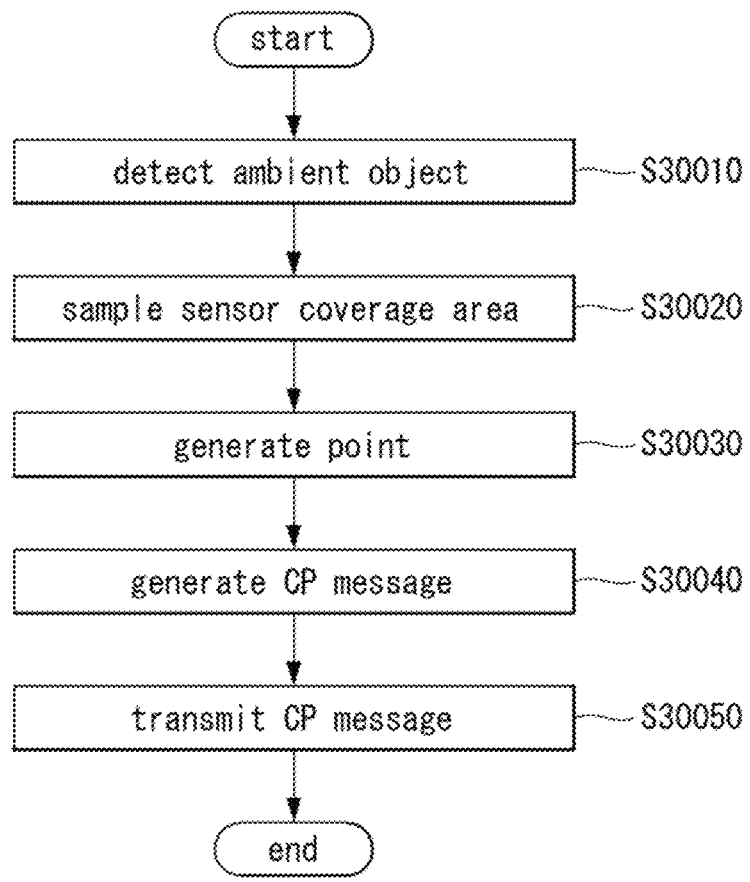

DEVICE AND METHOD FOR V2X COMMUNICATION

CROSS-REFERENCE TO RELATED APPLICATIONS

This application is the National Stage filing under 35 U.S.C. 371 of International Application No. PCT/KR2019/000421, filed on Jan. 10, 2019, the contents of which are all incorporated by reference herein in their entirety.

TECHNICAL FIELD

The disclosure relates to a device and method for V2X communication, and more particularly to a method of transmitting and receiving, by a V2X communication device, a collective perception message (CPM).

BACKGROUND ART

Recently, a vehicle becomes a product of a complex industrial technology in which electrical, electronic and communication technologies have been converged out of mechanical engineering. In this respect, a vehicle is also called a smart car. The smart car provides various customized mobile services in addition to conventional vehicle technologies, such as traffic safety/congestion solution, by connecting drivers, vehicles, and transportation infrastructure. Such connectivity may be implemented using a vehicle to everything (V2X) communication technology.

DISCLOSURE

Technical Problem

Various services can be provided through V2X communication. An ITS system of a vehicle performing the V2X communication can provide various services for traffic safety and efficiency. One of the services is a cooperative awareness (CA) service. Cooperative awareness within road traffic means that a road user and roadside infrastructure can be aware of mutual positions, dynamics and attributes. Such awareness is a basic for several road safety and traffic efficiency applications.

As described above, the CA service can support traffic safety in such a manner that a V2X communication device periodically provides its own position and state to surrounding V2X communication devices. However, the CA service has limits in that only information of a corresponding V2X communication device itself can be shared. In order to complement the limits, there is a need for the development of a service using a new method.

Technical Solution

In order to solve the above-described and other technical problems, the disclosure provides a device and method for V2X communication.

According to an embodiment of the disclosure, a method for transmitting a V2X message of a vehicle may comprise detecting a surrounding object using at least one sensor mounted to the vehicle, sampling a sensor coverage area of the vehicle, generating a point representing a sensor arrival distance by the at least one sensor mounted to the vehicle, for each sampled sensor coverage area, generating a CP message including information for the detected surrounding object and the point, and transmitting the CP message.

In an embodiment, the sampling of the sensor coverage area may be performed by sampling the sensor coverage area at angles of equivalent intervals by a preset number with respect to the center of the vehicle.

As an embodiment, the points may be sequentially generated for each sampled sensor coverage area with respect to the traveling direction of the vehicle.

According to an embodiment, the information for the surrounding object detected may include a sensor bit map indicating information for the sensor detecting the surrounding object, and each bit of the sensor bit map may be mapped to the sensor mounted to the vehicle.

According to an embodiment, the CP message may include sensor data for each sensor mounted to the vehicle, and generating the CP message may include randomly changing the order of the sensor data based on a preset random seed value.

According to an embodiment, sampling the sensor coverage area may further include representing a reference point for generating the points, and the points may be sequentially generated for each sampled sensor coverage area with respect to the angle offset.

According to an embodiment of the disclosure, a V2X communication device of a vehicle may comprise a memory storing data, a communication unit transmitting and receiving a wireless signal including a collective perception (CP) message, and a processor controlling the memory and the communication unit, wherein the processor may detect a surrounding object using at least one sensor mounted to the vehicle, sample a sensor coverage area of the vehicle, generate a point representing a sensor arrival distance by the at least one sensor mounted to the vehicle, for each sampled sensor coverage area, generate a CP message including information for the detected surrounding object and the point, and transmit the CP message.

In an embodiment, the sampling of the sensor coverage area may be performed by sampling the sensor coverage area at angles of equivalent intervals by a preset number with respect to the center of the vehicle.

As an embodiment, the points may be sequentially generated for each sampled sensor coverage area with respect to the traveling direction of the vehicle.

According to an embodiment, the information for the surrounding object detected may include a sensor bit map indicating information for the sensor detecting the surrounding object, and each bit of the sensor bit map may be mapped to the sensor mounted to the vehicle.

According to an embodiment, the CP message may include sensor data for each sensor mounted to the vehicle, and the processor may randomly change an order of the sensor data based on a preset random seed value.

According to an embodiment, the processor may set an angle offset indicating a reference for generating the point, and the point may be sequentially generated for each sampled sensor coverage area with respect to the angle offset.

Advantageous Effects

According to an embodiment of the disclosure, it is possible to effectively represent the sensor coverage of a vehicle using relatively little data.

Further, according to an embodiment of the disclosure, it is possible to simultaneously address the problem of matching only one sensor through the SensorID and privacy issues according to the use of the SensorID.

DESCRIPTION OF DRAWINGS

The accompany drawings which are included for further understanding of the disclosure and included in this disclosure and which form part of the disclosure illustrate embodiments of the disclosure along with the detailed description that describes the principle of the disclosure.

FIG. 1 illustrates exemplary architecture of a V2X communication device according to an embodiment of the disclosure.

FIG. 2 illustrates a method of processing a V2X message according to an embodiment of the disclosure.

FIG. 3 illustrates an architecture of a V2X communication device providing a CP service according to an embodiment of the disclosure.

FIG. 4 illustrates a function block diagram of a CP service according to an embodiment of the disclosure.

FIG. 5 illustrates a CPM structure according to an embodiment of the disclosure.

FIG. 6 illustrates a method of extracting sensor data by a V2X communication device providing a CP service according to an embodiment of the disclosure.

FIG. 7 illustrates a CP service as an embodiment to which the disclosure is applicable.

FIG. 8 illustrates a structure of a CPM message according to an embodiment to which the disclosure is applied.

FIG. 9 illustrates a method of managing a CPM message according to an embodiment of the disclosure.

FIG. 10 is a view for describing a problem that occurs according to a conventional sensor coverage representation method.

FIG. 11 is a view for describing a sensor coverage transmission method according to an embodiment of the disclosure.

FIGS. 12 and 13 are views illustrating an example method for representing a sensing area according to an embodiment of the disclosure.

FIGS. 14 and 15 are views for describing problems with a conventional sensor information representation scheme used for object detection.

FIG. 16 is a view illustrating an example sensor information representation method according to an embodiment of the disclosure.

FIGS. 17 and 18 are views for describing a sensor index scrambling method according to an embodiment of the disclosure.

FIG. 19 is a view illustrating a sensor mount information changing method using an angle offset according to an embodiment of the disclosure.

FIG. 20 is a view illustrating a sensor mount information changing method using an angle offset according to an embodiment of the disclosure.

FIG. 21 is a view illustrating a structure of a CPM message according to an embodiment of the disclosure.

FIG. 22 is a view illustrating an example sensor information container according to an embodiment of the disclosure.

FIG. 23 is a view illustrating an example format of sensor data according to an embodiment of the disclosure.

FIG. 24 is a view illustrating an example format of object data according to an embodiment of the disclosure.

FIG. 25 is a block diagram illustrating an example V2X transmitter according to an embodiment of the disclosure.

FIG. 26 is a block diagram illustrating an example V2X receiver according to an embodiment of the disclosure.

FIG. 27 is a flowchart illustrating a method for generating a CPM message according to an embodiment of the disclosure.

FIG. 28 is a flowchart illustrating a method for decoding a CPM message according to an embodiment of the disclosure.

FIG. 29 illustrates configuration of a V2X communication device according to an embodiment of the disclosure.

FIG. 30 is a flow chart illustrating a method of sending an ITS message by a V2X communication device according to an embodiment of the disclosure.

BEST MODE FOR DISCLOSURE

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the disclosure, but the disclosure does not require all of these details. The embodiments described below need not be separately used. A plurality of embodiments or all embodiments may be together used, and specific embodiments may be used in combination with each other.

Most of the terms used in this disclosure are selected from common ones widely used in the corresponding field, but some terms are arbitrarily selected by the applicant and the meaning thereof will be described in detail in the following description as necessary. Therefore, the disclosure should be understood based on the intended meanings of the terms rather than the simple names or meanings of the terms.

The disclosure relates to a V2X communication device. The V2X communication device is included in an intelligent transport system (ITS), and may perform some of or all the functions of the ITS system. The V2X communication device may perform communication between a vehicle and a vehicle, a vehicle and infrastructure, a vehicle and a bicycle, or with a mobile device. In one embodiment the V2X communication device may correspond to the on board unit (OBU) of a vehicle or may be included in an OBU. The OBU may be referred to as an on board equipment (OBE). The V2X communication device may correspond to a road side unit (RSU) of infrastructure or may be included in an RSU. The RSU may be referred to as roadside equipment (RSE). Alternatively, the V2X communication device may correspond to an ITS station or may be included in an ITS station. All of given OBU, RSU and mobile equipment that perform V2X communication may be referred to as ITS stations. Alternatively, the V2X communication device may correspond to a wireless access in vehicular (WAVE) apparatus or may be included in a WAVE apparatus. The V2X communication device may be abbreviated as a V2X apparatus.

Hereinafter, a collective perception (CP) service provided by the V2X communication device and a basic structure of a CP message (CPM) for the CP service (hereinafter, may be referred to as CPS) are first described. Furthermore, various embodiments of a CPM structure for performance improvements of the CP service are described. In the disclosure, various embodiments are described, assuming that the V2X communication device generating the CPM is a V2X communication device of a vehicle. However, the following embodiments described below may be applied to a V2X communication device of an RSU or a personal V2X communication device in the same or similar manner, if necessary or desired. In the disclosure, the CPM may also be referred to as a CPM message.

FIG. 1 is a view illustrating an exemplary architecture of an V2X communication device according to an embodiment of the disclosure. FIG. 1 may be an exemplary architecture of a V2X communication device that may be implemented based on, for example, the reference architecture of an ITS station compliant with the EU standard.

Application layer: The application layer may implement and support various use cases. For example, an application may provide road safety, efficient traffic information, and other application information.

Facilities layer: The facilities layer may support effective implementation of various usage examples defined in the application layer.

This facilities layer may basically support the same or similar functions as the upper three layers of an OSI model. In addition, facilities for the V2X communication device may be provided. For example, the facilities layer may provide facilities such as application support, information support, and session/communication support. Here, the facilities refer to a component that provides functionality, information, and data. The three facilities proposed as an example will be described as follows.

The application support facility refers to a facility that supports a basic application set (or message set). In the case of the V2X communication device of FIG. 1, the facilities layer may support V2X messages/ITS messages, for example, a periodic message such as CAM or an event message such as Decentralized Environmental Notification Messages (DENM). The facilities layer may also support, for example, CPM messages.

The information support facility may be a facility that provides common data information or database used for a basic application set (or message set), and may be, for example, a Local Dynamic Map (LDM).

The session/communication support facility is a facility that provides services for communication and session management, and may be an addressing mode, a session support and the like.

As described above, the facilities layer supports the application set (or message set) as one of main functions thereof. That is, the facilities layer performs a role of generating a message set (or message) based on information to be transmitted or a service to be provided by the application layer. The generated message may be referred to as an V2X message/ITS message, which will be described in detail below with reference to the accompanying drawings.

Access layer: The access layer may transmit the message/data received at the upper layers through a physical channel. For example, the access layer may perform/support data communication, based on an IEEE 802.11 and/or 802.11p standards-based communication technology, an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE 1609 WAVE technology.

Network and Transport Layer: The network/transport layer may configure a network for vehicle communication between homogenous/heterogeneous networks, by using various transport protocols and network protocols.

The transport layer is a connection layer between services provided by the upper layers (session layer, presentation layer, and application layer) and the lower layers (network layer, data link layer, and physical layer). The transport layer may manage the transmitted data to exactly arrive at a destination. At the transmitting side, the transport layer may process the data into packets of an appropriate size for efficient data transmission, and at the receiving side, the transport layer may perform processing to recover the received packets to the original file. In an embodiment, protocols such as Transmission Control Protocol (TCP), User Datagram Protocol (UDP), and Basic Transport Protocol (BTP) may be used as a transport protocol.

The network layer may manage the logical address, and may determine the delivery path of the packet. The network layer may receive the packet generated in the transport layer, and may add the logical address of the destination to a network layer header. In an embodiment, the packet path may be considered for unicast/broadcast between vehicles, between vehicles and fixed stations, and between fixed stations. In an embodiment, geo-networking, IPv6 networking with mobility support, and IPv6 over geo-networking may be considered as the networking protocol.

The exemplary architecture of V2X communication device may further include a management layer and a security layer.

FIG. 2 is a view illustrating a method of processing a V2X message according to an embodiment of the disclosure.

As described above, the application layer or the facilities layer may generate a V2X message. For example, a CAM, a DENM, or a CPM message may be generated as the V2X message.

The transport layer may generate a BTP packet, and the network layer may encapsulate the BTP packet to generate a GeoNetworking packet. The GeoNetworking packet may be encapsulated into an LLC packet. In the embodiment of FIG. 2, the data may include a message set, and the message set may become a basic safety message.

BTP is a protocol for transmitting the V2X message generated in a facilities layer to a lower layer. A BTP header includes A type and B type. The A type BTP header may include a destination/destination port and a source port, which are necessary for transmission/reception in interactive packet transmission. The B type header may include destination port and destination port information necessary for transmission in non-interactive packet transmission. A description of fields/information included in the header is as follows.

Destination Port: The destination port identifies a facility entity corresponding to the destination of the data (BTP-PDU) included in the BTP packet.

Source Port: As a field generated in the case of the BTP-A type, the sound port indicates the port of the protocol entity of the facilities layer at a source to which the corresponding packet is transmitted. This field may have a size of 16 bits.

Destination Port Info: As a field generated in the case of the BTP-B type. The destination port info may provide additional information when the destination port is the most well-known port. This field may have a size of 16 bits.

The GeoNetworking packet includes a basic header and a common header according to the protocol of the network layer, and selectively includes an extension header according to the geo networking mode. The GeoNetworking header will be again described below.

An LLC header is added to the GeoNetworking packet to generate an LLC packet. The LLC header provides a function of distinguishing and transmitting IP data and GeoNetworking data. The IP data and the GeoNetworking data may be distinguished by Ethertype of SNAP. In an embodiment, when IP data is transmitted, the Ether type may be set to 0x86DD and included in the LLC header. In an embodiment, when GeoNetworking data is transmitted, the Ether type may be set to 0x86DC and included in the LLC header. A receiver may check the Ethertype field of the LLC packet header, and may forward and process the packet to the IP data path or the GeoNetworking path according to the value of the Ethertype field of the LLC packet header.

FIG. 3 illustrates an architecture of a V2X communication device providing a CP service according to an embodiment of the disclosure.

The V2X communication device may provide various services for traffic safety and efficiency. One of the services may be a cooperative awareness (CA) service. The cooperative awareness in road traffic means that road users and roadside infrastructures can know mutual positions, dynamics and attributes. Here, the road users may be all kinds of users on or near a road, which act as traffic safety and control, such as a vehicle, a truck, a motorcycle, a bicycle or a pedestrian, and the roadside infrastructures may be equipments including a road sign, a traffic light or a barrier, and an entrance.

This awareness of each other becomes basics of several road safety and traffic efficiency applications. This can be performed by regular exchange of information between the road users at vehicle to vehicle (V2V), vehicle to infrastructure (V2I), infrastructure to vehicle (I2V) or everything to everything (X2X), etc. which are based on a wireless network called a V2X network.

The cooperative safety and traffic efficiency applications require the V2X communication device to develop situational awareness that includes the presence and behavior of road users around the V2X communication device. For example, the V2X communication device may develop situational awareness through communication with its own sensors and other V2X communication devices. In this instance, the CA service may specify how the V2X communication device can inform its own position, dynamics and attributes by sending a cooperative awareness message (CAM).

As above, in the CA service, the V2X communication device may periodically provide its own position and state to surrounding V2X communication devices, thereby supporting traffic safety. However, the CA service has a limitation in that only information of the corresponding V2X communication device itself can be shared. In order to overcome this limitation, it is necessary to develop services such as a CP service.

The CP service may specify how the V2X communication device can inform other V2X communication devices about the position, dynamics, and attributes of surrounding road users and other objects that are detected. For example, the CP service may share this information with other V2X communication devices through the sending of collective perception messages (CPM). This CP service may be an optional facility for all types of V2X communication devices (vehicle V2X communication device, RSU V2X communication device, personal V2X communication device, etc.) participating in road traffic.

Hereinafter, a CPM transmitted by a V2X communication device participating in a V2X network and a CP service for transmitting the CPM are described in detail with reference to FIG. 3. In the disclosure, the CPM may be a message exchanged between V2X communication devices via a V2X network, and may be used to generate collective perception for road users and other objects detected and/or recognized by the V2X communication device. In this instance, the detected road user or object may be a road user or an object which is not equipped with a V2X communication device, but is not limited thereto.

As described above, the V2X communication device sharing information through the CAM shares only information about the state recognition of the V2X communication device itself with other V2X communication devices in order to generate cooperative awareness. In this case, since the road user or other objects unequipped with the V2X communication device are not a part of the system, a view about safety and traffic management related situations is limited.

One method for improving this is that a system that is equipped with the V2X communication device and is able to recognize road users and objects unequipped with the V2X communication device informs other V2X communication devices of the presence and state of road users and objects unequipped with a V2X device. In order to easily increase the safety and traffic management performance, the CP service recognizes the cooperative awareness of the presence of the road user and the object unequipped with the V2X device, and hence can easily increase the safety and traffic management performance of the system equipped with the V2X communication device.

As shown in FIG. 3, the CP service may be a facilities layer entity that operates a CPM protocol. For example, the CP service may be a part of an application support domain of the facilities layer. FIG. 3 illustrates a logical interface for the CP service and other layers in the architecture of the V2X communication device and a potential logical interface for entities in the facilities layer.

This CP service may provide two services, for example, sending and receiving of the CPM. The CP service may be fundamentally different from the CA service in that the CP service cannot receive input data about a host V2X communication device, for example, from a VDP or POTI unit.

The sending of the CPM includes generation and transmission of the CPM. In a process for generating the CPM, an originating V2X communication device configures a CPM, and then the CPM is delivered to the networking and transport layer for dissemination. In the disclosure, the originating V2X communication device may be referred to as a sending V2X communication device, a transmitting V2X communication device, a host V2X communication device, etc.

In order to collect relevant information for the CPM generation and to deliver the received CPM content for additional processing, the CP service may interface with other entities in the facilities layer and V2X applications in the facilities layer. In an embodiment, at the V2X communication device, the entity for data collection may be a facility that provides object detection at a host object detector.

Further, in order to disseminate (or send) the CPM, the CP service may use services provided by protocol entities of the networking and transport layer. For example, the CP service may interface with the networking and transport layer (N&T) through NF-SAP to exchange CPM messages with other V2X communication devices. In addition, the CP service may interface with the secure entities through SF-SAP to access the security service for CPM dissemination and CPM reception, may interface with the management entities through MF-SAP, and may interface with the application layer through FA-SAP if the received CPM data are directly provided to the application.

The dissemination of the CPM may vary depending on the applied communication system. For example, in the ITS-G5 network (defined in ETSI EN 302 663), the CPM may be sent to all the V2X communication devices within a direct communication range by the originating V2X communication device. The communication range may be particularly affected by the originating V2X communication device by changing the transmission power according to a relevant region.

Further, the CPM may be periodically generated at a rate that is controlled by the CP service in the originating V2X communication device. The generation frequency may be determined considering a radio channel load determined by decentralized congestion control (DCC), and determined in consideration of the state of the detected non-V2X object, for example, dynamic behavior of position, speed or direction, and transmission of the CPM for the same (perceived) object by other V2X communication devices.

Further, when the receiving V2X communication device receives the CPM, the CP service allows the contents of the CP to be able to be used in facilities within the receiving V2X communication device, such as a V2X application and/or a local dynamic map (LDM). For example, the local dynamic map (LDM) may be updated with the received CPM data. The V2X application may retrieve this information from the LDM for additional processing.

FIG. 4 illustrates a function block diagram of a CP service according to an embodiment of the disclosure. More specifically, FIG. 4 illustrates a functional block of a CP service and a function block having interfaces for other facilities and layers according to an embodiment of the disclosure As shown in FIG. 4, the CP service may provide the following sub-functions for CPM transmission and reception.

CPM encoding: This sub-function may configure or generate a CPM according to a predefined format. In this instance, the latest in-vehicle data may be included in the CPM.

CPM decoding: This sub-function may decode the received CPM.

CPM transmission management: This sub-function may implement a protocol operation of the originating V2X communication device. In particular, this may include activation and termination of the CPM transmission operation, determination of the CPM generation frequency, and trigger of the CPM generation.

CP reception management: This sub-function may implement a protocol operation of the receiving V2X communication device. In particular, this may include triggering "CPM decoding" function in the CPM reception, providing the received CPM data to the LDM or the V2X application of the receiving V2X communication device, and checking information of the optionally received CPM.

The CPM dissemination is described in detail below. Specifically, the requirements for CPM dissemination, CP service activation and termination, CPM trigger conditions, CPM generation cycle, constraints, etc. are described.

In an embodiment, point-to-multipoint communication may be used for CPM transmission. For example, when ITS-G5 is used for CPM dissemination, a control channel (G5-CCH) may be used. In an embodiment, the CPM generation may be triggered and managed by the CP service while the CP service is being activated. For example, the CP service may be activated together with the activation of the V2X communication device and may be terminated when the V2X communication device is terminated.

In an embodiment, the host V2X communication device may send a CPM whenever at least one object having a sufficient level of confidence that needs to be exchanged with the neighboring V2X communication device is detected. With regard to the inclusion of the detected object, the CP service should consider a trade-off between the object age and the channel utilization. For example, in terms of an application using information received by the CPM, updated information should be provided as frequently as possible. However, in terms of the ITS-G5 stack, the channel utilization should be minimized, and thus a low transmission cycle is required. Accordingly, considering this, the V2X communication device should appropriately include the detected object or object information in the CPM. In order to reduce a resulting message size, the object needs to be evaluated before transmission thereof.

FIG. 5 illustrates a CPM structure according to an embodiment of the disclosure. In an embodiment of FIG. 5, the CPM structure may be a basic CPM structure.

As described above, the CPM may be a message exchanged between V2X communication devices in a V2X network and may be used to generate collective perception for road users and/or other objects detected and/or recognized by the V2X communication device. That is, the CPM may be an ITS message for generating the collective perception for an object detected by the V2X communication device.

In an embodiment, the CPM may include state and attribute information of road users and objects detected by the originating V2X communication device. The content may vary depending on types of detected road users or objects and a detection performance of the originating V2X communication device. For example, in the case of a vehicle object, the state information may at least include information on an actual time, a position, and a motion state. Further, the attribute information may include attributes such as a dimension, a vehicle type, and a role within road traffic.

The CPM may complement the CAM and act similarly to the CAM. That is, this may be to increase the cooperative awareness. The CPM may include externally observable information about the detected road user or object. The CP service may include a method of reducing replication or duplication of a CPM sent by a different V2X communication device by checking a CPM sent by another station.

Upon the CPM reception, the receiving V2X communication device may recognize the presence, type and state of the road user or object that has been detected by the originating V2X communication device. The received information may be used by the receiving V2X communication device in order to support V2X applications for increasing safety and improving traffic efficiency and travel time. For example, by comparing the received information with the state of the detected road user or object, the receiving V2X communication device may estimate a risk of collision with the road user or object. Further, the receiving V2X communication device may inform a user through a human-machine interface (HMI) of the receiving V2X communication device, or may automatically take corrective actions.

A basic structure/format of the CPM is described below with reference to FIG. 5. This CPM format may be presented as ASN.1. Also, a data element (DE) and a data frame (DF) which are not defined in the disclosure may be derived from the common data dictionary specified in ETSI TS 102 894-2.

Referring to FIG. 5, the CPM may include an ITS protocol data unit (PDU) header and a plurality of containers.

The ITS PDU header is a common header including information on a protocol version, a message type, and an ITS ID of the originating V2X communication device. The ITS PDU header is a common header used in the ITS message and exists in the starting part of the ITS message. The ITS PDU header may be referred to as a common header, a header, etc.

The plurality of containers may include an originating vehicle container (OVC), a perceived (or detected) object container (POC), and/or a field-of-view container (FOC) (or may be referred to as a sensor information container (SIC)). For example, the CPM may include the OVC as a mandatory container and may optionally include the FoVC and the POC. Each container is described below with reference to Tables 1 to 3.

Table 1 represents an exemplary OVC in the CPM.

TABLE 1

| DE | |
|---|---|
| Generation Delta Time | TS 102 894-2 [2] CDD reference |
| | See CAM ETSI EN 302 637-2 [3] |
| Reference Position | A.124 |
| Heading | A.112 |
| Longitudinal Speed | A.126 |
| Lateral Speed | A.126 |
| Vehicle Length | A.131 |
| Vehicle Width | A.95 |

Specifically, Table 1 shows data elements (DEs) and/or data frames (DFs) included in the exemplary OVC. Here, the DE is a data type including single data. The DF is a data type that includes one or more elements in the predefined order. For example, the DF may be a data type that includes one or more DEs and/or one or more DFs in the predefined order.

The DE/DF may be used to configure a facilities layer message or a V2X application layer message. Examples of the facilities layer message may include a CAM, a CPM, a DENM, and the like. In the disclosure, these messages may be referred to as V2X messages or ITS messages.

As shown in Table 1, the OVC includes basic information related to the V2X communication device that disseminates the CPM. The OVC may be interpreted as a scale-down version of the CAM, but may include only the DE required for a coordination transformation process. That is, although similar to the CAM, the OVC provides basic information about the originating V2X communication device. However, the included information focuses on supporting the coordinate transformation process.

The OVC may provide the followings.

The latest geographic position of the originating V2X communication device obtained by the CP service upon the CPM generation The lateral and longitudinal absolute velocity components of the originating V2X communication device Geometric dimensions of the originating V2X communication device Each information (DE or DF) is described below with reference to Table 1.

Generation delta time: as the DE, indicates time corresponding to time of a reference position in the CPM. This may be considered as time of the CPM generation. In the disclosure, the generation delta time may be referred to as a generation time.

Reference position: as the DF, indicates a geographic position of the V2X communication device. This indicates a geographic point position. In an embodiment, the reference position includes information about a latitude, a longitude, a position confidence and/or an altitude. Here, the latitude represents a latitude of the geographic point, and the longitude represents a longitude of the geographic point. Further, the position confidence represents the accuracy of the geographic position, and the altitude represents an altitude and altitude accuracy of the geographic point.

Heading: as the DF, indicates an orientation in a coordinate system. In an embodiment, the heading includes information about heading value and/or heading confidence. Here, the heading value indicates a traveling direction based on the north, and the heading confidence indicates accuracy of a reported heading value having a predefined confidence level.

Longitudinal speed: as the DF, may describe a longitudinal speed and accuracy of speed information about a moving object (e.g., a vehicle). In an embodiment, the longitudinal speed includes information on speed values and/or speed accuracy. Here, the speed value represents a speed value in the longitudinal direction, and the speed accuracy represents accuracy of the reported speed value.

Lateral speed: as the DF, may describe a lateral speed and accuracy of speed information about a moving object (e.g., a vehicle). In an embodiment, the lateral speed includes information on speed values and/or speed accuracy. Here, the speed value represents a speed value in the lateral direction, and the speed accuracy represents accuracy of the reported speed value.

Vehicle length: as the DF, represents a vehicle length and an accuracy indication. In an embodiment, the vehicle length includes information about a vehicle length value and/or a vehicle length accuracy indication. Here, the vehicle length represents a length of the vehicle, and the vehicle length accuracy indication represents an indication of reported length value confidence.

Vehicle width: as the DE, indicates a width of the vehicle. For example, the vehicle width may represent the width of the vehicle including side mirrors. For example, when the vehicle width is equal to or greater than 6.1 meters, the value has to be set to 61. If this information is not available, the value has to be set to 62.

Table 2 shows an exemplary FOC (or SIC) in the CPM.

TABLE 2

| DE | SI-Unit | Description |
|---|---|---|
| Sensor ID | — | Unique ID of sensor which is used to identify by which sensor an object has been perceived. The ID is a random number generated when the ITS-S is activated and never changes until the ITS-S is deactivated. |
| Sensor Type | — | Enumeration of sensor types: undefined (0), radar (1), lidar (2), monovideo (3), stereovision (4), nightvision (5), ultrasonic (6), fusedObject (7), pmd(8) |
| Sensor Position | | |
| Position X | m | Mounting position of the sensor in negative x-direction according to the ISO 8855 [i.15] reference frame, measured from the ETSI reference position (see Clause B.19 in EN 302 637-2 [3]) |
| Position Y | m | Mounting position of the sensor in y-direction according to the ISO 8855 [i.15] reference frame, measured from the ETSI reference position (see Clause B.19 in EN 302 637-2 [3]) |
| Radius | m | Average perception range of the sensor as defined by the manufacturer |

TABLE 2-continued

| DE | SI-Unit | Description |
|---|---|---|
| Opening Angle | | |
| Begin Angle | deg | Start angle of the sensor frustum in ISO 8855 [i.15] coordinate system |
| End Angle | deg | End angle of the sensor frustum in ISO 8855 [i.15] coordinate system |
| Quality Class | — | Classification of sensor defining the quality of measured objects |

The FOC provides a description of at least one sensor mounted on the originating V2X communication device. When the V2X communication device is equipped with a multi-sensor, the description may be added several times. For example, the FOC provides information about sensor capabilities of the originating V2X communication device. To this end, generic sensor characteristics which provide a mounting position of a sensor on the disseminating V2X communication device as well as a sensor type and a range and an opening angle of the sensor (i.e., frustum of the sensor) may be included as a part of the message. This information may be used by the receiving V2X communication device to select an appropriate prediction model according to a performance of the sensor.

Each piece of information (DE or DF) is described below with reference to Table 2.

Sensor ID: This indicates a unique ID of a sensor used to identify a sensor by which an object has been perceived (or detected). That is, the sensor ID indicates a unique ID of a sensor that detects the object. In an embodiment, the sensor ID is a random number generated when the V2X communication device is activated, and may never change until the V2X communication device is deactivated.

Sensor type: This indicates a type of sensor. That is, the sensor type is enumerated. For example, the sensor type may be undefined (0), radar (1), lidar (2), monovideo (3), stereovision (4), nightvision (5), ultrasonic (6), fusedObject (7), or pmd(8).

Sensor position: Position X indicates a mounting position of the sensor in the negative x-direction, and position Y indicates a mounting position of the sensor in the y-direction.

Radius: This indicates an average perception range of the sensor as defined by the manufacturer.

Opening angle: a begin angle indicates a start angle of the sensor frustum, and an end angle indicates an end angle of the sensor frustum.

Quality Class: This represents classification of the sensors that define the quality of the measured objects.

Table 3 shows an exemplary POC in the CPM.

TABLE 3

| DE | TS 102 894-2 [2] CDD reference | Mandatory | Description |
|---|---|---|---|
| Time of Measurement | | Yes | Time in micro-seconds from the message reference time. Defines the relative age of the measured object. |
| Object ID | | Yes | Unique random ID assigned to object. This ID is maintained (i.e. does not change) as long as the object is tracked (i.e. |
| | | | considered by the disseminating ITS-S's data fusion processes). |
| Sensor ID | | Yes | Corresponds to the Sensor ID DE in Table 4. This DE is used to relate the object information to the sensor providing the measurement. |
| Longitudinal Distance | | Yes | |
| Distance Value | | Yes | Relative x-distance to object in originator reference frame ISO 8855 [i.15] |
| Distance Confidence | | Yes | Confidence of relative x-distance to object in originator reference frame ISO 8855 [i.15] |
| Lateral Distance | | Yes | |
| Distance Value | | Yes | Relative y-distance to object in originator reference frame ISO 8855 [i.15] |
| Distance Confidence | | Yes | Confidence of relative y-distance to object in originator reference frame ISO 8855 [i.15] |
| Longitudinal Speed | A.126 | Yes | Longitudinal speed of detected object along with confidence as described in CDD |
| Lateral Speed | A.126 | Yes | Lateral speed of detected object along with confidence as described in CDD |
| Object Heading | A.112 | No | Absolute orientation of object in WGS84 reference frame, if provided by data fusion process |
| Object Length | | No | |
| Length Value | | No | Measured length of the object |
| Length Confidence | | No | Confidence of measured length of the object |
| Object Width | | No | |
| Width Value | | No | Measured width of the object |
| Width Confidence | | No | Confidence of measured width of the object |
| Object Type | A.78 | No | Classification of object, if provided by data fusion process |

The POC is used to describe an object perceived by the sensor in terms of the transmitting V2X communication device. Upon reception of the POC, the receiving V2X communication device may perform the coordinate transformation process with the help of the OVC to convert a position of the object into a reference frame of a receiving vehicle. In order to reduce the message size, several optional DEs may be provided, which may be used when the originating V2X communication device can provide the DE.

The POC may be configured with selection of DEs to provide an abstract description of the perceived (or detected) object. For example, relative distance and velocity information and timing information about the perceived object related to the originating V2X communication device may be included in the POC as a mandatory DE. In addition, when the sensor of the originating V2X communication device can provide requested data, additional optional DEs may be provided.

Each information (DE or DF) is described below with reference to Table 3.

Measurement time: This indicates time in microseconds from a message reference time. This may define a relative age of the measured object.

Object ID: This indicates a unique random ID assigned to an object. This ID is maintained (i.e., is not changed) as long as the object is tracked (i.e., as long as considered by data fusion processes of the disseminating V2X communication device).

Sensor ID: This is an ID corresponding to the sensor ID DE in Table 2. This DE may be used to relate object information to a sensor providing the measurement.

Longitudinal distance: A distance value indicates a relative x-distance to the object in an originator reference frame, and distance confidence: this indicates a confidence of a relative x-distance to the object in the originator reference frame.

Lateral distance: A distance value indicates a relative x-distance to the object in the originator reference frame, and distance confidence: this indicates a confidence of the relative x-distance to the object in the originator reference frame.

Longitudinal speed: This indicates a longitudinal speed of the detected object according to the confidence.

Lateral speed: This indicates a lateral speed of the detected object according to the confidence.

Object heading: This indicates an absolute orientation of the object in the reference frame, if provided by the data fusion process.

Object length: A length value indicates a measured length of the object, and length confidence: this indicates a confidence of the measured length of the object.

Object width: A width value indicates a measured width of the object, and width confidence: this indicates a confidence of the measured width of the object.

Object type: this represents the classification of the object, if provided by the data fusion process.

FIG. 6 illustrates a method of extracting sensor data by a V2X communication device providing a CP service according to an embodiment of the disclosure. More specifically, FIG. 6(a) illustrates how the V2X communication device extracts sensor data at a low level, and FIG. 6(b) illustrates how the V2X communication device extracts sensor data at a high level.

A source of sensor data to be transmitted as a part of any CPM needs to be selected according to requirements of a prospective data fusion process on the receiving V2X communication device. In general, the transmitted data should be as close as possible to original sensor data. However, simply transmitting the original sensor data, for example, raw data is not a viable solution. Because this imposes very high requirements in regard to a data rate and a transmission cycle. FIGS. 6(a) and 6(b) illustrate possible implementations for selecting data to be transmitted as a part of the CPM.

In an embodiment of FIG. 6(a), sensor data is obtained from different sensors and is processed as a part of a low-level data management entity. This entity may select object data to be inserted as a part of a next CPM, and also calculate the plausibility of the detected object. In FIG. 6(a), because data of each sensor is transmitted, an amount of data transmitted through the V2X network increases, but there is an advantage in that sensor information can be efficiently utilized in the receiving V2X communication device.

In an embodiment of FIG. 6(b), sensor data or object data provided by a data fusion process specific to the V2X communication device manufacturer are transmitted as a part of the CPM. In FIG. 6(b), because integrated sensor data collected into one via a data fusion block is transmitted, there is an advantage in that a small amount of data is transmitted through the V2X network. However, there is a disadvantage that it is dependent on the collection method of the V2X communication device collecting the sensor information. In this case, because different data fusion processes can be implemented by different manufacturers, this implementation method is not generally preferred to FIG. 6(a).

Each time the object is detected by the sensor of the V2X communication device regardless of the implementation type, the plausibility thereof needs to be calculated. When the plausibility of the object exceeds a given threshold PLAUS OBJ, the transmission should be considered. For example, when an absolute difference between a current yaw angle of the detected object and a yaw angle included in the CPM that has been previously sent by the originating V2X communication device exceeds 4°, when a difference between a relative distance of current positions of the originating V2X communication device and the detected object and a relative position between the originating V2X communication device and the detected object included in the CPM that has been previously sent by the originating V2X communication device exceeds 4 meters, or when an absolute difference between a current velocity of the detected object and a velocity included in the CPM that has been previously sent by an originating object exceeds 0.5 m/s, the transmission may be considered.

The CAM is a technology in which a vehicle provided with a V2X module periodically transmits its position and state to a surrounding V2X vehicle to help more stable driving. However, the existing CAM had a limitation of sharing only information of its own vehicle, and thus a collective perception service (CPS) technology is being discussed to complement this. Because vehicles equipped with an ADAS technology are constantly increasing, many vehicles are equipped with sensors such as camera, radar, Lidar, etc. to recognize many surrounding vehicles and perform a driving driver assistance function. The CPS technology is a technology that informs the surroundings of sensor data recognizing a surrounding environment through V2X communication in an ADAS.

The disclosure proposes an effective managing method of the CPS technology transmitting information of the surrounding vehicle and a communication algorithm suitable for a V2X communication environment, in order to complement the CAM message transmitting only information of its own vehicle.

FIG. 7 illustrates a CP service as an embodiment to which the disclosure is applicable.

Referring to FIG. 7, it is assumed that each of TxV1 and RxV2 vehicles is equipped with at least one sensor and has a sensing range shown by the dotted line.

The TxV1 vehicle having a CPS function may recognize RV1 to RV11 vehicles, that are surrounding objects belonging to the sensing range, using several ADAS sensors mounted on the TxV1 vehicle. Object information obtained as described above may be delivered to surrounding vehicles equipped with a V2X receiver through the V2X communication. For example, an RxV1 vehicle not having the sensor among the surrounding vehicles receiving a CPS message can obtain information of the vehicles that follow, and an RxV2 vehicle equipped with the sensor can also obtain information of an object that is out of a sensing range of the RxV2 vehicle or is positioned at a blind spot.

As illustrated in FIG. 3 above, to this end, the facilities layer can provide the above-described CP service. That is, the CP service may be performed in the facilities layer and may use the services that internally exist in the facilities layer. Here, a local dynamic map (LDM) is a service providing a map and may provide map information for the CP service. A position and time (POTI) is a service providing a position of the vehicle and time and may provide a position of its own vehicle and exact time using the corresponding information. A vehicle data provider (VDP) is a service providing information about the vehicle and may transmit by loading information, such as the size of its own vehicle, on the CPM using this.

The ADAS vehicles are equipped with various sensors, such as a camera, an infrared sensor, radar, and Lidar, for the purpose of a driver driving assistance. The respective sensors may individually recognize an object, and object information recognized thus may be collected and fused by a data fusion block and may be provided to an ADAS application. Referring again to FIG. 6 above, for the CP service, a method of collecting (or fusing) sensor information in the existing ADAS technology is described.

An existing sensor for ADAS or an existing sensor for CPS may always track surrounding objects and collect relevant data. In this case, when sensor values for CPS service are used, sensor information may be collected using two methods. Referring to FIG. 6(a), the respective sensor values may be individually provided to the surrounding vehicles through the CP service. As illustrated in FIG. 6(a), because information is transmitted for each sensor, an amount of data transmitted through the V2X increases, but there is an advantage in that a receiving system can efficiently utilize each piece of sensor information. Referring to FIG. 6(b), integrated sensor information collected into one after the data fusion block may be provided to the CP service. In such a case, there is an advantage in that a size of the CPM message sent through the V2X decreases, but there is a disadvantage that it is dependent on a collection method of the vehicle collecting sensor information.

FIG. 8 illustrates a structure of a CPM message according to an embodiment to which the disclosure is applied.

Referring to FIG. 8, a CPM message may include header, originating station container (OSC), sensor information container (SIC), and perceived object container (POC) fields (or data, information, containers).

The header may include 'protocolVersion', 'messageID', 'stationID' and/or 'generationDeltaTime' fields. The respective fields represent, in turn, a version of protocol, an ID for distinguishing messages, an ID for distinguishing stations, and time at which the messages are generated.

The OSC field used to transmit information of its own vehicle may include 'BasicContainer' field and/or 'StationData' field. The stations may be roughly distinguished into a vehicle and a road side unit (RSU), and 'StationData' field suitable for this may exist. Commonly needed originating station information may be included in the 'BasicContainer' field.

The 'BasicContainer' field of the OSC may include 'referencePosition' field representing a reference position of the vehicle transmitting the CPM and 'stationType' field representing a station type (e.g., vehicle, RSU). The 'StationData' field of the OSC may be defined differently depending on the station type. If the station is the vehicle, the 'StationData' field may include 'OrignatingVehicleContainer' field, and the 'OrignatingVehicleContainer' field may include 'Heading', 'Speed', 'OrientationDeltaAngle', 'driveDirection', 'Acceleration' and/or 'trailerData' fields (or data, information, containers). The respective fields may represent, in turn, a vehicle's driving direction, a vehicle's driving speed, an angle between the vehicle's driving direction and the vehicle's front, a vehicle's acceleration, and trailer information. If the station is the RSU, the 'StationData' field may include 'intersectionReferenceID' field and/or 'RoadSegmentationID' field, and the respective fields may represent an intersection identification ID and a road ID.

The SIC represents a container used to deliver installation/function information of the sensor used to detect the object. The SIC may include a vehicle sensor field or an RSU sensor field depending on the station type. The vehicle sensor field may include SensorID representing an ID of the sensor, SensorType representing a type of the sensor, offset data (represented by offset based on xOffset, yOffset, zOffset, and referencePosition) representing a position of the sensor, and/or data representing a measuring range (range, horizontalFrustumStart/End, verticalFrustumStart/End, measuring distance, horizontal measuring range, vertical measuring range) of the sensor. The RSU sensor field may include SensorID representing an ID of the sensor, offset information (represented by offset based on xOffset, yOffset, zOffset, and referencePosition) representing a position of the sensor, and/or data representing a measuring range (range, horizontalFrustumStart/End, verticalFrustumStart/End, measuring distance, horizontal measuring range, vertical measuring range) of the sensor.

The POC is a container that contains information of surrounding objects collected through the sensors. 'ObjectData' field including each object information is generated according to the number of measured objects. For example, if four objects are measured, four object data may be included in the POC field.

The object data may include 'ObjectID' representing an ID of the object, data 'SensorID' and 'TimeOfMeasurement' representing a sensor and time used in the measurement, position information ('xDistance', 'yDistance', 'zDistance'; representing x-distance, y-distance, and z-distance at 'referencePosition') of the measured object, motion information ('xSpeed', 'ySpeed', 'zSpeed', 'xAcceleration', 'yAcceleration', 'zAcceleration'; representing speed and acceleration at x-axis, y-axis, and z-axis) of the object, size information ('planarObjectDimension 1', 'planarObjectDimension1', 'verticalObjectDimension'; informing size and height values of the horizontal plane that the object has) of the object, and/or state information ('classification', 'lanePosition', 'intersectionTopologyPositoin'; vehicle type of the object, lane information of the object, and intersection position information of the object) of the object.

FIG. 9 illustrates sensor information according to an embodiment of the disclosure.

A CP service is a service that informs the surroundings of information for an object, measured (or detected) using a sensor. A V2X vehicle may inform the surrounding vehicles of information for the sensor used for measuring the object, as well as the measured object information. By providing the detection radius (i.e., sensor coverage) of the sensor as well, it is possible to distinguish between the absence of the object and failure to detect the object. In other words, the V2X vehicle providing the CP service may inform its surrounding vehicles of the coverage of the sensors used to detect the object via a CPM message. As described above in connection with FIG. 8, the CPM message may represent the coverage of a sensor via an SIC indicating the container used to transfer installation/function information for the sensor used to detect an object.

Referring back to Table 2 described above, the SIC may include SensorID, SensorType, SensorPosition, Radius, OpeningAngle, and QualityClass fields (or data, parameters) as illustrated in the table below. Through the data included in the CPM message, the V2X vehicle may inform its surrounding vehicles of the coverage information for the sensor as illustrated in FIG. 9. A duplicate description of each field (or data) will be omitted.

As the sensor position, the position of the sensor installed is represented using the x-axis and y-axis coordinates from the center of the front of the vehicle. In this case, the measurement range of the sensor may be represented through the begin angle, end angle, and the radius representing the measurement distance of the sensor. The angle may be expressed up to 360 degrees clockwise with respect to the forward direction of the vehicle. Measurement accuracy per sensor may be represented through the quality class.

As described above in connection with Table 3 and FIG. 8, the POC is data (or a container) containing information for surrounding objects gathered via a sensor and may include object data indicating data for each of objects measured. In this case, information for the sensor used to measure the object may be expressed through the sensorID field.

Conventional sensor information notation for a CP service has the following problems with the coverage expression of the sensor, the SensorID expression used for object detection, and privacy.

First, the conventional sensor coverage expression method suffers from an increase in size and cannot make all expressions by the notation. In other words, in the conventional method as described above, each sensor information may include fields, such as of sensor position, sensor angle, and radius, and each field may have a size of 2 bytes. As the ADAS or autonomous vehicle goes to a higher level, the number of sensors increases. In this case, according to the conventional method, a larger data size is required to express sensor information. When the size increases to express sensor information, the efficiency of the channel used for inter-V2X communication is inevitably reduced.

Further, the conventional method for expressing the coverage of a sensor in a polar coordinate system using angle and radius fails to accurately represent the range of the sensor and may not efficiently represent sensors having various coverages, such as cameras or ultrasonic sensors mounted to the vehicle. Thus, a need exists for a method for reducing the size of data used for sensor information signaling.

Second, the conventional method for notifying of the sensor used to detect an object has a problem in that it cannot make an expression through SensorID included in the legacy ObjectData when a plurality of sensors are used to detect an object.

Third, the SensorID used to ensure privacy does not have a fixed value but rather a random value that continuously varies. In contrast, since the sensor mount (or sensor installation) information always has a fixed value, privacy may be exposed regardless of the continuously changing SensorID.

FIG. 10 is a view for describing a problem that occurs according to a conventional sensor coverage representation method.

Referring to FIG. 10, according to the conventional sensor representation method, mismatch and inefficiency occur between the coverage area of a sensor mounted to (or installed to) a vehicle and an area expressed in a polar coordinate system.

Specifically, according to the conventional sensor representation method, a radar sensor may make a pie slice-shaped expression but this may differ from a range of actual sensing as illustrated in FIG. 10(a). In the disclosure, a range sensed by sensors mounted to a vehicle may be referred to as a sensing area, coverage, coverage area, or field of view (FoV).

Further, as illustrated in FIG. 10(b), in the case of a camera module sensor, the range of sensor that may be processed by the wide-angle filter or software may not be expressed as a pie slice shape. Further, when many sensors are added as illustrated in FIG. 10(c) and FOVs (or coverage) of the sensors overlap or are included, the conventional representation method ends up using unnecessary data. Therefore, according to the disclosure, there is proposed a new sensor information representation method for more accurately representing a sensor range while addressing the foregoing issues.

In an embodiment of the disclosure, the entire sensor coverage area (or sensing area) of a vehicle may be expressed by an interpolation method. In other words, the transmitter transmitting a CPM message may transmit sample values obtained by sampling the coverage area of the vehicle sensor, and the receiver may receive the sample values and perceive the sensor FOV of the transmitter by interpolation. As an embodiment, the transmitter vehicle may transmit sampled points. In the disclosure, the points represent the radius of the sampled sensing area (or the reach of the sensor or the distance from a reference point). This is described below with reference to the drawings.

FIG. 11 is a view for describing a sensor coverage transmission method according to an embodiment of the disclosure.

Referring to FIG. 11, the sensor coverage area of a vehicle may be expressed using points via sampling. A reference point of sampling may be the center of the vehicle or the center of the front of the vehicle. A point in the traveling direction of the vehicle with respect to the reference point may be defined as point[1]. The points of the sampled coverage area may be configured as in Equation 1 below.

[Equation 1]

$$FoV = \text{point}[i], i \in 1:N$$

Referring to Equation 1, the coverage area may have N points. In this case, each point may be expressed as in Equation 2 below.

[Equation 2]

$$\text{point}[i] = r^i$$

Referring to Equation 2, in an embodiment, each point may be expressed using a polar coordinate system. However, the disclosure is not limited thereto, and the point may be expressed as a typical distance value instead of a polar coordinate value. In this case, each point may have an angle of an equal interval. The corresponding angle may be obtained using the total number of points as illustrated in Equation 3 below.

[Equation 3]

$$\theta^{interval} = 360°/N$$

In other words, referring to Equation 3, the angle of the equal interval may be calculated by dividing 360° by the total number of samples.

FIGS. 12 and 13 are views illustrating an example method for representing a sensing area according to an embodiment of the disclosure.

FIG. 12 shows an example sensing area by sensors of an ADAS vehicle. The sensors mounted to the vehicle may include a front long radar that measures (or detects or analyzes) a vehicle or object in front, a near radar that measures a near area, side radars and/or a back long radar that measures a vehicle or object behind. There may further be included a front camera vision mounted on the front, side visions mounted on the side mirrors, and an ultrasonic sensor mounted on the rear.

If the sensing areas of the vehicle having many sensors are individually represented per sensor as illustrated in FIG. 12, unnecessarily much data may be used. Further, for vision sensors and ultrasonic sensors, it is impossible to represent a sensing area by the conventional representation scheme as described above.

However, referring to FIG. 13, according to an embodiment of the disclosure, it is possible to effectively represent the entire sensing area of the vehicle using less information regardless of the number of sensors mounted to the vehicle. It is also possible to easily represent areas that used to be impossible to process, such as vision sensors or ultrasonic sensors. As described above, a sensor area may be sequentially represented by setting a point in a position in front of the vehicle as Point[1] and using each point at an angle of 360/N.

For example, when 12 sensors are used, the conventional method uses the PositionX(2B), PositionY(2B), BeginAngle (2B), EndAngle(2B) and Radius(2B) fields for each sensor and thus needs a total size of 120 bytes. However, if the interpolation scheme proposed according to the disclosure is used, 60 points in total may be provided for the same data size, and in this case, the points may be set at 6-degree intervals.

FIGS. 14 and 15 are views for describing problems with a conventional sensor information representation scheme used for object detection.

Referring to FIG. 14, it is hypothesized that a first sensor which is a long radar, a second sensor which is a front vision, and a third sensor which is a near radar are used for forward measurement, and a first object is detected by all of the first to third sensors. In the CPS, information for objects detected through sensors may be transmitted through a perceived object container (POC). In particular, as described above, the POC may include a SensorID indicating information for the sensor used to detect the object.

A CPS message may be generated in a data format as illustrated in FIG. 15. A sensor information container (SIC) may include information for each of the three sensors. The Sensor #1, Sensor #2, and Sensor #3 fields may include information for the first sensor, the second sensor, and the third sensor, respectively.

The POC may include information for the detected objects. The Object #1 field 15010 included in the POC may include information regarding a first object detected. In this case, the Object #1 field 15010 may include a SensorID field indicating ID information for the sensor used to detect the corresponding object.

In this case, as illustrated in FIG. 14, when the corresponding object is detected using multiple sensors, such an issue may arise as to which sensor value needs to be set. In other words, if only information for some sensors (or one sensor) among the sensors detecting the object is represented as in the SensorID field included in the object data as conventional, it may be impossible to effectively transmit information for the surroundings of the vehicle and to exert the maximum performance. Therefore, according to the disclosure, there is proposed a new object detection sensor representation method to address such issues.

FIG. 16 is a view illustrating an example sensor information representation method according to an embodiment of the disclosure.

Referring to FIG. 16, a V2X vehicle may inform of the sensor used for object detection using a sensor bit map. The sensor bit map field (or parameter) may sequentially indicate whether sensors that have detected an object are used, in bits.

In one embodiment, the size of the sensor bit map field may be determined as the maximum number of sensors allowed (or included) in the SIC. If information for 10 sensors is included in the SIC, the sensor bit map field may have a size of 10 bits. Each sensor data may be defined in bits. As an embodiment, the MSB of the sensor bit map may indicate the first sensor, and the LSB may indicate the tenth sensor.

If the value of the bit assigned to a specific sensor is 1, it indicates that the sensor is used for object detection. Conversely, if the value is 0, it indicates that the sensor is not used for object detection.

If three sensors all detect the object as in the embodiment of FIG. 14, this means that the first to third sensors have been used for object detection, and thus, the MSB through the third bit among the bits of the sensor bit map may be assigned 1's, and the rest may be assigned 0's. As a result, the sensor bitmap may be set as 0b1110000000. Upon receiving the sensor bitmap, the receiver may recognize that the first object has been detected through the first to third sensors. According to an embodiment of the disclosure, it is possible to address the problem of matching only one sensor through the SensorID and privacy issues according to the use of the SensorID.

In V2X communication, since vehicle information, such as sensor mount (or sensor installation) information, is periodically transmitted to the surroundings in a broadcast manner, a privacy issue for protecting personal information inevitably occurs. To protect privacy, the conventional method uses random values, as the SensorID, not to have a continuous value. However, even in the conventional method, although the SensorID varies, the sensor mount information remains the same. By the sensor mount information which remains the same value, vehicle tracking is possible, causing privacy issues.

Therefore, according to the disclosure, there is proposed a method for reinforcing privacy by changing sensor mount information so as to address such issues. First proposed is a method for scrambling (or mixing) sensor indexes included in sensor data when the legacy SIC data format described with reference to FIG. 8 and Table 2 is used.

FIGS. 17 and 18 are views for describing a sensor index scrambling method according to an embodiment of the disclosure.

Referring to FIG. 17, according to the prior art (i.e., the method described in connection with FIG. 8 and Table 2), the SIC container may include as many pieces of sensor information as the number of sensors mounted to the vehicle. In this case, the sensor information may include sensor ID information.

According to an embodiment of the disclosure, the V2X vehicle may mix sensor indexes by scrambling the order of sensor data. As an embodiment, the V2X vehicle may include a scrambler that mixes the sensor indexes. By mixing the fixed sensor indexes using the scrambler, it is possible to prevent the vehicle from being tracked using vehicle sensor mount information.

Meanwhile, in another embodiment, if a fixed scrambler is used, a pattern may exist even in such a method. To address this issue, the seed value of the scrambler may be set to be randomly varied.

If the scrambler whose seed value is randomly varied as such, the sensor ID may be randomly changed whenever a CPS message is transmitted, and the order of sensors, i.e., sensor indexes, may simultaneously be randomly changed as well.

Referring to FIG. 18, it is hypothesized that there are three sensors (a first sensor, a second sensor, and a third sensor) mounted to a vehicle. The vehicle may change the order of sensor data as illustrated in FIG. 18, using a scrambler proposed herein. Thus, when a surrounding vehicle, e.g., a hacker, continuously receives signals, the sensor data contained in the sensor information container may be changed for its indexes and the sensor mount information is thus avoided from having a fixed value, thereby enhancing privacy. Described below is a method for addressing privacy issues using angle offsets when the legacy SIC data format described above in connection with FIG. 8 and Table 2 is used.

FIG. 19 is a view illustrating a sensor mount information changing method using an angle offset according to an embodiment of the disclosure.

Referring to FIG. 19, it is assumed that the SIC data format according to the prior art (that is, the method described in connection with FIG. 8 and Table 2) is used. By the method described above in connection with FIGS. 17 and 18, the order of sensor data is changed by mixing the sensor indexes via the scrambler, so that the entire data is changed. However, since the same value remains between the sensor data blocks for the same sensor, it may be difficult to fully protect privacy. Thus, according to the disclosure, there is proposed a method for changing sensor mount information using an angle offset to address such issue.

Referring to FIG. 19(a), in the conventional method, the begin angle parameter and end angle parameter of the vehicle are represented with respect to the forward direction of the vehicle.

Referring to FIG. 19(b), according to an embodiment, the reference direction may be adjusted via an angle offset, and the begin angle parameter and end angle parameter may thereby be changed as well. In other words, the V2X vehicle may use a changed reference point, not the reference point in the forward direction of the vehicle, in calculating angles. If the reference point is changed, the angles of all the sensors may also be changed, thereby maximizing privacy.

According to an embodiment, the above-described angle offset may be included and signaled with the CPM message, and the receiver may extract and use the same in the sensor ID using a random value. Described below is a method for enhancing privacy when a sensing area is represented using the interpolation method as described above in connection with FIGS. 11 to 13.

FIG. 20 is a view illustrating a sensor mount information changing method using an angle offset according to an embodiment of the disclosure.

Referring to FIG. 20, when a sensing area is represented using the interpolation method described above with reference to FIGS. 11 to 13, the V2X vehicle may designate a start point (or reference point) of a sampled point using an angle offset.

Referring to FIG. 20(a), in the method described above with reference to FIGS. 11 to 13, the first point may be determined with respect to the forward direction of the vehicle. If the reference point is fixed in the forward direction of the vehicle as such, the entire sensing area of the vehicle is the same, and thus, each point value may be the same.

Referring to FIG. 20(b), according to an embodiment, the reference direction for setting the first point may be adjusted through the angle offset so that all the points have different values. According to an embodiment, the above-described angle offset may be included and signaled with the CPM message, and the receiver may extract and use the same in the sensor ID using a random value.

FIG. 21 is a view illustrating a structure of a CPM message according to an embodiment of the disclosure.

Referring to FIG. 21, the CPM message may include a header (Header), Originating Station Container (OSC), Sensor Information Container (SIC), and Perceived Object Container (POC) field (or data, information, and container). A description that overlaps with the content previously described in FIG. 8 will be omitted.

The SIC may include a sensor mount field and/or a sensor data field. In other words, in an embodiment of the disclosure, data representing the coverage of a sensor in legacy sensor data may be separately extracted and commonly expressed through the sensor mount field. In other words, the sensor mount field may include coverage data of sensor included in the legacy sensor data. The sensor data field may include information for each sensor (e.g., sensor ID, sensor type, etc.) other than the sensor coverage-related information. Further, the sensor ID included in the object data in the POC to notate the influence by multiple sensors may be changed according to the method described above with reference to FIG. 16.

FIG. 22 is a view illustrating an example sensor information container according to an embodiment of the disclosure.

In an embodiment of the disclosure, the CPM message may include a SIC as illustrated in FIG. 22. In this case, the data format may be expressed as ASN.1.

Referring to FIG. 22, the SIC may include an Offset, numPoint, Point, and/or SensorData field (or parameter, data, and data frame). The Offset field indicates a reference point for enhancing privacy performance, and the method described above with reference to FIGS. 19 and 20 may be applied. As an embodiment, the Offset field may be defined as an integer, and may be set in units of 1 degree, clockwise (or counterclockwise) with respect to the progress direction. For example, if the Offset value is 20, the first point, Point[1], may be set from a position of 20 degrees from the reference point.

The numPoint field indicates the total number of points used and may be defined as an integer. The numPoint value may be calculated using Equation 3 above. The Point field indicates the radius of sensor coverage. In this case, the methods described above in connection with FIGS. 11 to 13 may be applied. The Point field may be defined as an integer and may have a distance value in units of 0.1 meters. The Point field may be configured as a sequence and be set as many as numPoint. As conventional, the individual characteristics of each sensor may be included in the SensorData field. In an embodiment, up to 10 SensorData fields may be included, and the corresponding data may have a structure of DF_SensorData.

FIG. 23 is a view illustrating an example format of sensor data according to an embodiment of the disclosure.

Referring to FIG. 23, the SensorData data frame included in the SIC may include SensorID, SensorType, and QualityClass fields (or data, parameters). As described above with reference to FIG. 9, the Sensor ID indicates the ID of the sensor and may have a random value whenever a CPM message is transmitted (or generated). SensorType indicates the type of sensor, and QualityClass indicates the measurement capability of the sensor.

FIG. 24 is a view illustrating an example format of object data according to an embodiment of the disclosure.

As described above, when an object is detected using a multiple sensors, if expressed via the legacy SensorID, only one sensor may be selected. According to an embodiment of the disclosure, it is possible to signal whether the used sensor is used using a sensor bit map.

Referring to FIG. 24, object data may include an 'ObjectID' field indicating the ID of the object, a sensor bit map field, a data (TimeOfMeasurement) field indicating the measurement time of the object, location information ('xDistance', 'yDistance', 'zDistance'; indicate the x, y, z distances in 'referencePosition') field for the measured object. The fields described above with reference to FIG. 8 may be further included.

In other words, instead of the legacy SensorID, a SensorBitMap may be included. The SensorBitMap field may be defined as an integer and may indicate the sensors sequentially from the MSB. As described above, '1' may mean that the corresponding sensor is used, and '0' may mean that the sensor is not used.

FIG. 25 is a block diagram illustrating an example V2X transmitter according to an embodiment of the disclosure.

Referring to FIG. 25, signals (or data) sensed via sensor modules 25010, 25020, and 25030 mounted to a vehicle are transmitted to a sensor merge block 25040, and an object information extraction block 25050 extracts an object from the data received from the sensor merge block 25050.

A V2X transmission system (or device) 25000 may generate a CPS message in the facility layer of a V2X modem 25080, perform encoding with ASN.1, and transmit it via the network and transport layer (N&T layer) and the access layer and RF. A new sensor range information representation method for sensor information for CPM according to the disclosure has been described above. To this end, the V2X transmission system (or device) 25000 may further include a sensor coverage sampling block 25060 and/or a random generator block 25070.

The V2X transmission system (or device) 25000 senses a surrounding vehicle or object using the plurality of sensor modules 25010, 25020, and 25030 mounted to the vehicle, and the sensor merge block 25040 merges sensor data using the sensed data, and the object information extraction block 25050 extracts an object from the data received from the sensor merge block 25040.

In this case, the sensor coverage sampling block 25060 may perform sampling on the sensor coverage area considering interpolation on the receiver side. If the method for enhancing privacy is applied according to the embodiment described above with reference to FIGS. 17 to 20, an offset value is generated via the random generator block 25070, and the start point of sampling may be changed thereby. Thereafter, the facility layer of the V2X modem 25080 may generate a CPS message including the used offset data and the sensor coverage sampling information generated according to an embodiment of the disclosure, along with the object information included in the legacy CPM.

FIG. 26 is a block diagram illustrating an example V2X receiver according to an embodiment of the disclosure.

Referring to FIG. 26, a V2X modem 26070 receives the RF signal and receives (or restores, decodes) the CPS message via the access layer, network and transport layer, and a new facility layer according to an embodiment of the disclosure.

An object information acquisition block 26040 processes the POC included in the received CPS message. The method described above with reference to FIGS. 11 to 13 may be applied to the SIC included in the CPS message. In other words, according to an embodiment of the disclosure, a sensor coverage acquisition block 26050 may obtain a sensor coverage area from the SIC included in the CPS message based on the method described above with reference to FIGS. 11 to 13. The sensor coverage acquisition block 26050 may calculate the sensor coverage area by interpolating the values sampled to represent the sensor range.

Further, when the above-described privacy enhancement method is applied, if privacy is enhanced and transmitted, the sensor coverage acquisition block 26050 may use the offset 26060 value included in the CPM message during interpolation. The so-obtained information may be processed through a system controller 26030 and then guided to the user via a human interface 26010, and the vehicle may be controlled via an actuator 26020.

FIG. 27 is a flowchart illustrating a method for generating a CPM message according to an embodiment of the disclosure.

Referring to FIG. 27, when the CPS service providing system starts, the V2X vehicle (or V2X communication device) initializes the system (S27010).

The V2X vehicle processes the sensor received via sensing in the initialized sensor module (S27020) and objects (or extracts or detects) surrounding object information (S27030).

The V2X vehicle calculates the sensor coverage to be included in the SIC to generate a CPS message (S27040). In privacy enhancement mode, the V2X vehicle may generate (or determine) an offset (S27050).

The V2X vehicle samples the area to represent a sensor coverage area (S27060). In privacy enhancement mode, the V2X vehicle may change the reference point for performing sampling using the offset. Not in the privacy enhancement mode, the offset may be 0 as default, and the same reference point as conventional may be used. Thereafter, point values of the sampled sensor coverage area may be extracted.

The V2X vehicle generates a CPM message (S27070). The CPM message may include the sensor coverage information generated in the above-described step. The CPM message generated in step S27070 may be generated into packets (S27080, S27090) while passing through the network & transport layer and the access layer and may then be wirelessly transmitted. Thereafter, if the system is not terminated, the V2X vehicle may periodically provide a CPS service via sensor information acquisition.

FIG. 28 is a flowchart illustrating a method for decoding a CPM message according to an embodiment of the disclosure.

Referring to FIG. 28, a receiver initializes the system if the system starts (S28010). The receiver may prepare to start the V2X system and the communication module via system initialization.

The receiver waits to receive a CPM message via the connected V2X communication modem (S28020). If a V2X signal, i.e., a CPM message, is received via the V2X receiver (S28030), the input signal passes through the access layer and the network & transport layer and data is input through NF-SAP, and the CPM message is decoded in the facility layer (S28040).

The receiver decodes the CPM message to obtain an SIC including sensor information (S28050) and obtains the POC containing the object information (S28090). The receiver determines whether to apply privacy using the offset information contained in the SIC (S28060). In privacy enhancement mode, the V2X vehicle may change the reference point for performing sampling using the offset (S28070).

The receiver performs interpolation using the point values included in the SIC (S28080). The receiver may extract the object value using the POC (S28090) and obtain information for the sensors used to extract the object using the sensor bit map (S28100). Thereafter, the information calculated via the above-described two routes may be transferred to the application layer (S28110) and a CPS service may be provided based thereupon.

FIG. 29 illustrates configuration of a V2X communication device according to an embodiment of the disclosure. As described above, the V2X communication device may be referred to as a V2X communication device, a V2X device, etc.

In FIG. 29, a V2X communication device 29000 may include a communication unit 29010, a processor 29020, and a memory 29030.

The communication unit 29010 is connected to the processor 29020 and may transmit/receive a radio signal. The communication unit 29010 may up-convert data received from the processor 29020 into a transmission/reception band to transmit a signal, or may down-convert the received signal. The communication unit 29010 may implement at least one operation of the physical layer or the access layer.

The communication unit 29010 may include a plurality of sub-RF units in order to perform communication according to a plurality of communication protocols. In one embodiment, the communication unit 29010 may perform data communication based on ITS-G5 wireless communication technology based on a physical broadcast technology of dedicated short range communication (DSRC), IEEE 802.11 and/or 802.11p standard, and IEEE 802.11 and/or 802.11p standard, 2G/3G/4G(LTE)/5G wireless cellular communication technology including satellite/wideband wireless mobile communication, wideband terrestrial digital broadcasting technology such as DVB-T/T2/ATSC, GPS technology, IEEE 1609 WAVE technology, and the like. The communication unit 29010 may include a plurality of transceivers that implement the respective communication technologies.

The processor 29020 is connected to the RF unit 29030 and may implement operations of the layers of the V2X communication device. The processor 29020 may be configured to perform operations according to various embodiments of the disclosure according to the figures and the description described above. Furthermore, at least one of a module, data, a program or software that implements operations of the V2X communication device 29000 according to various embodiment of the disclosure may be stored in the memory 29030 and executed by the processor 29020.

The memory 29030 is connected to the processor 29020 and stores various information for driving the processor 29020. The memory 29030 may be included inside the processor 29020 or installed outside the processor 29020, and may be connected to the processor 29020 by known means.

The processor 29020 of the V2X communication device 29000 may perform the generation and transmission of a CPM described in the disclosure. A method of generating and transmitting the CPM by the V2X communication device 29000 is described below.

FIG. 30 is a flow chart illustrating a method of sending an ITS message by a V2X communication device according to an embodiment of the disclosure. In an embodiment of FIG. 30, the V2X communication device may be a V2X communication device of a vehicle. The vehicle is equipped with a sensor, and may detect a surrounding object using the sensor.

The V2X communication device detects a surrounding object using at least one sensor mounted to the vehicle (S30010).

The V2X communication device performs sampling on the sensor coverage area of the vehicle (S30020).

The V2X communication device generates (or determines) a point indicating a sensor arrival distance by at least one sensor mounted to the vehicle for each sampled sensor coverage area (S30030).

The V2X communication device generates a CP message including information for the surrounding object detected in step S30010 and the point generated in S30030 (S30040).

The V2X communication device transmits the CP message generated in step S30040 (S30050).

In an embodiment, the sampling of the sensor coverage area may be performed by sampling the sensor coverage area at angles of equivalent intervals by a preset number with respect to the center of the vehicle.

As an embodiment, the points may be sequentially generated for each sampled sensor coverage area with respect to the traveling direction of the vehicle.

According to an embodiment, the information for the surrounding object detected may include a sensor bit map indicating information for the sensor detecting the surrounding object, and each bit of the sensor bit map may be mapped to the sensor mounted to the vehicle.

According to an embodiment, the CP message may include sensor data for each sensor mounted to the vehicle, and generating the CP message may include randomly changing the order of the sensor data based on a preset random seed value.

According to an embodiment, sampling the sensor coverage area may further include representing a reference point for generating the points, and the points may be sequentially generated for each sampled sensor coverage area with respect to the angle offset.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

MODE FOR DISCLOSURE

It is obvious to those skilled in the art that the disclosure can be changed and modified in various ways without departing from the spirit or range of the disclosure. Accordingly, the disclosure is intended to include all the changes and modifications provided by the appended claims and equivalents thereof In the disclosure, both the device and method disclosures have been mentioned, and the descriptions of both the device and method disclosures can be complementarily applied.

Various embodiments have been described in the best form for implementing the disclosure.

INDUSTRIAL APPLICABILITY

The disclosure is used in a series of V2X communication fields.

It is obvious to those skilled in the art that the disclosure can be changed and modified in various ways without departing from the spirit or range of the disclosure. Accordingly, the disclosure is intended to include all the changes and modifications provided by the appended claims and equivalents thereof

The invention claimed is:

1. A method of transmitting a message of a vehicle, the method comprising:
   detecting at least one object based on at least one sensor mounted to the vehicle;
   sampling a sensor coverage area of the vehicle;
   generating a point representing a sensor arrival distance by the at least one sensor mounted to the vehicle, for each sampled sensor coverage area;
   generating a CPM (Collective Perception Message) including the point and information for the detected at least one object; and
   transmitting the CPM,
   wherein the CPM includes sensor data for each of the at least one sensor mounted to the vehicle, and
   wherein the generating the CPM further includes randomly changing an order of the sensor data based on a preset random seed value.

2. The method of claim 1,
   wherein sampling the sensor coverage area is performed by sampling the sensor coverage area at angles of equal intervals by a preset number with respect to a center of the vehicle.

3. The method of claim 1,
   wherein the point is sequentially generated for each of the sampled sensor coverage area with respect to a traveling direction of the vehicle.

4. The method of claim 1,
   wherein the information for the detected at least one object includes a sensor bit map representing information for a sensor detecting the at least one object, and
   wherein each bit in the sensor bit map is mapped to a sensor mounted to the vehicle.

5. The method of claim 1, wherein sampling the sensor coverage area further includes:
   setting an angle offset representing a reference point for generating the point, and
   wherein the point is sequentially generated for each of the sampled sensor coverage area with respect to the angle offset.

6. A communication device of a vehicle, comprising:
   a memory storing data;
   a communication unit transmitting and receiving a wireless signal including a CPM (collective perception message); and
   a processor controlling the memory and the communication unit, wherein the processor is configured to:
   detect at least one object based on at least one sensor mounted to the vehicle;
   sample a sensor coverage area of the vehicle;
   generate a point representing a sensor arrival distance by the at least one sensor mounted to the vehicle, for each sampled sensor coverage area;
   generate a CPM including the point and information for the detected at least one object; and
   transmit the CPM,
   wherein the CPM includes sensor data for each of the at least one sensor mounted to the vehicle, and
   wherein the processor randomly changes an order of the sensor data based on a preset random seed value.

7. The communication device of claim 6,
   wherein the sensor coverage area is sampled by sampling the sensor coverage area at angles of equal intervals by a preset number with respect to a center of the vehicle.

8. The communication device of claim 6,
   wherein the point is sequentially generated for each of the sampled sensor coverage area with respect to a traveling direction of the vehicle.

9. The communication device of claim 6,
   wherein the information for the detected at least one object includes a sensor bit map representing information for a sensor detecting the at least one object, and
   wherein each bit in the sensor bit map is mapped to a sensor mounted to the vehicle.

10. The communication device of claim 6,
    wherein the processor sets an angle offset representing a reference point for generating the point, and
    wherein the point is sequentially generated for each of the sampled sensor coverage area with respect to the angle offset.

* * * * *